United States Patent
S et al.

(10) Patent No.: US 11,277,313 B2
(45) Date of Patent: Mar. 15, 2022

(54) DATA TRANSMISSION METHOD AND CORRESPONDING DEVICE

(71) Applicant: HUAWEI TECHNOLOGIES CO., LTD., Guangdong (CN)

(72) Inventors: Nagesh S, Bangalore (IN); Zhen Cao, Beijing (CN); Jianjian Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/145,932

(22) Filed: Jan. 11, 2021

(65) Prior Publication Data
US 2021/0135944 A1 May 6, 2021

Related U.S. Application Data

(63) Continuation of application No. PCT/CN2019/128482, filed on Dec. 25, 2019.

(30) Foreign Application Priority Data

Apr. 28, 2019 (CN) .......................... 201910351873.X

(51) Int. Cl.
*H04L 12/24* (2006.01)
*H04L 12/707* (2013.01)
(Continued)

(52) U.S. Cl.
CPC .......... *H04L 41/0893* (2013.01); *H04L 45/24* (2013.01); *H04L 69/161* (2013.01); *H04L 69/22* (2013.01)

(58) Field of Classification Search
CPC ..... H04W 28/18; H04W 76/15; H04W 40/02; H04L 45/24; H04L 29/06; H04L 41/0893; H04L 69/22; H04L 69/161
See application file for complete search history.

(56) References Cited

U.S. PATENT DOCUMENTS 10,587,498 B2 * 3/2020 Zee ...................... H04L 67/141
2014/0351447 A1 * 11/2014 Annamalaisami .... H04L 69/163
709/227
(Continued)

FOREIGN PATENT DOCUMENTS

| CN | 101925125 A | 12/2010 |
|---|---|---|
| CN | 102215530 A | 10/2011 |

(Continued)

OTHER PUBLICATIONS

Coninck et al., "Multipath Extension for QUIC, draft-deconinck-quic-multipath-01," QUIC Working Group, Internet-Draft, Sep. 4, 2018, 27 pages.

(Continued)

*Primary Examiner* — Frantz B Jean
(74) *Attorney, Agent, or Firm* — Fish & Richardson P.C.

(57) ABSTRACT

This application provides example data transmission methods and corresponding example devices. One example method includes sending, by a first device, a first packet to a second device, where the first packet includes transmission policy negotiation information, and where the transmission policy negotiation information is used to negotiate a transmission policy used when the second device uses a multipath connection. The first device can then receive a second packet from the second device, where the second packet includes first policy information, and where the first policy information indicates a transmission policy used when the second device uses the multipath connection. The first device can then transmit data with the second device based on the first policy information by using a transmission policy corresponding to the first policy information.

20 Claims, 17 Drawing Sheets

(51) Int. Cl.
    *H04L 41/0893*     (2022.01)
    *H04L 45/24*     (2022.01)
    *H04L 69/16*     (2022.01)
    *H04L 69/22*     (2022.01)

(56) References Cited

U.S. PATENT DOCUMENTS

| | | | | |
|---|---|---|---|---|
| 2017/0346724 | A1 | 11/2017 | Calin et al. | |
| 2020/0359264 | A1* | 11/2020 | Racz | H04W 28/0819 |
| 2021/0037422 | A1* | 2/2021 | Kolding | H04W 28/10 |
| 2021/0058329 | A1* | 2/2021 | Perras | H04L 45/24 |
| 2021/0152465 | A1* | 5/2021 | Han | H04L 45/24 |

FOREIGN PATENT DOCUMENTS

| | | | | |
|---|---|---|---|---|
| CN | 103634299 A | | 3/2014 | |
| CN | 105704759 | * | 6/2016 | H04W 28/10 |
| CN | 105704759 A | | 6/2016 | |
| CN | 107911844 A | | 4/2018 | |

OTHER PUBLICATIONS

Ford et al., "TCP Extensions for Multipath Operation with Multiple Addresses, draft-ietf-mptcp-rfc6824bis-12," Internet Engineering Task Force, Internet-Draft, Oct. 3, 2018, 80 pages.

Ford et al., "TCP Extensions for Multipath Operation with Multiple Addresses," Internet Engineering Task Force (IETF), RFC6824, Jan. 2013, 64 pages.

MultiPath TCP—Linux Kernel implementation [online], "Welcome to the Linux Kernel Multipath TCP project," retrieved from URL <https://multipath-tcp.org/pmwiki.php/Main/HomePage>, last modified May 2, 2020, retrieved on Dec. 30, 2020, 4 pages.

Nagle, "Congestion Control in IP/TCP Internetworks," Network Working Group, RFC896, Jan. 6, 1984, 9 pages.

PCT International Search Report and Written Opinion issued in International Application No. PCT/CN2019/128482 dated Mar. 16, 2020, 12 pages (partial English translation).

* cited by examiner

| MPQUIC extension option type | Length | Subtype subtype | Control request |

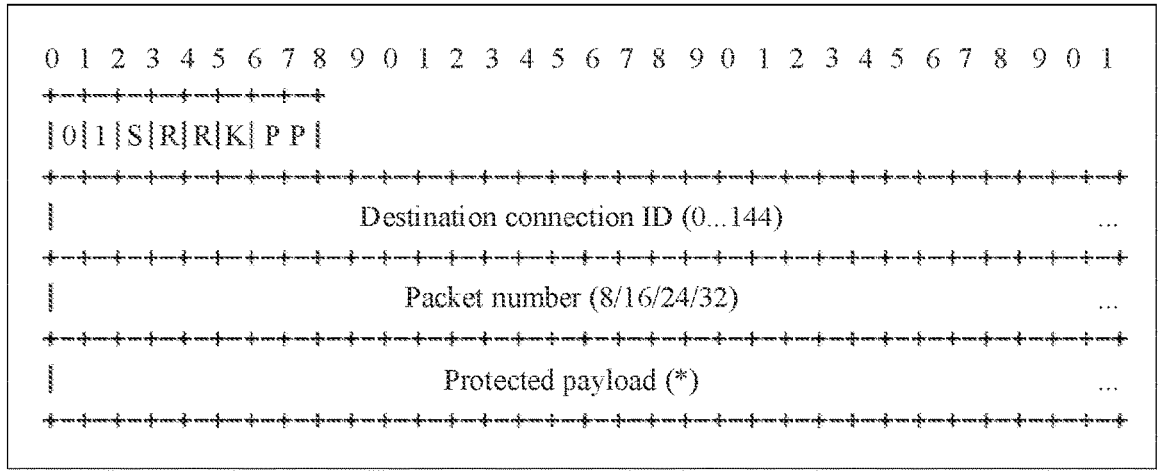
12A
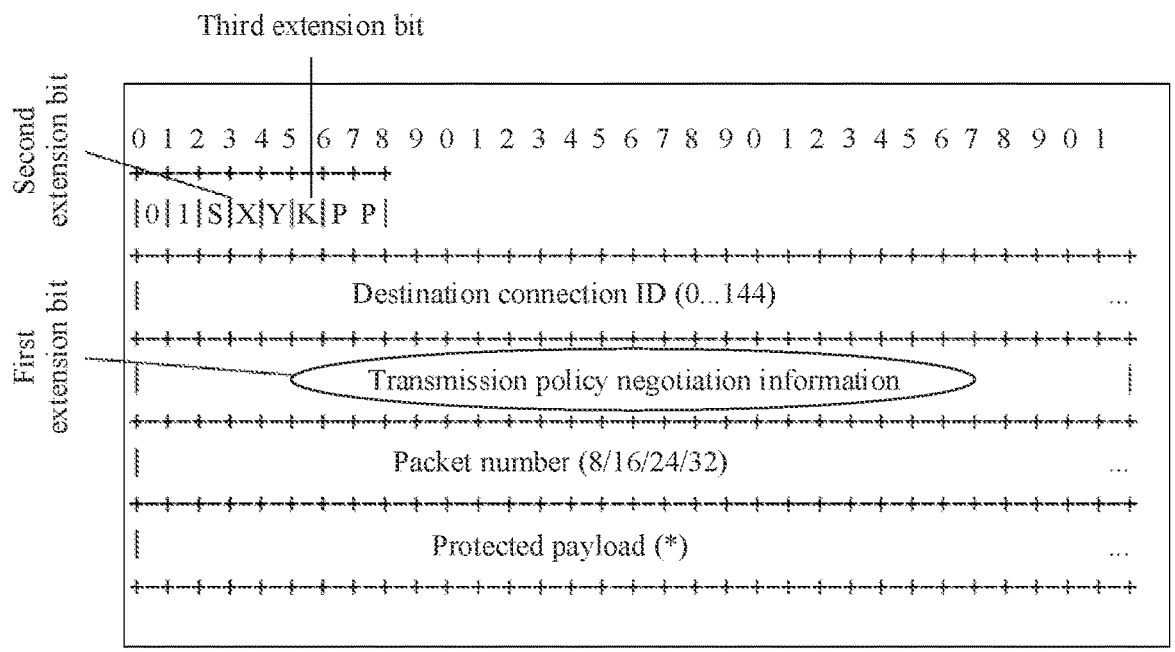
12B
FIG. 12
| MPTCP extension option type | Length | Subtype subtype | Control request |
FIG. 13

DATA TRANSMISSION METHOD AND CORRESPONDING DEVICE

CROSS-REFERENCE TO RELATED APPLICATIONS

This application is a continuation of International Application No. PCT/CN2019.128482, filed on Dec. 25, 2019, which claims priority to Chinese Patent Application No. 201910351873.X, filed on Apr. 28, 2019. The disclosures of the aforementioned applications are hereby incorporated by reference in their entireties.

TECHNICAL FIELD

Embodiments of this application relate to the field of mobile communication, and in particular, to a data transmission method, a corresponding device, a computer device, and a storage medium.

BACKGROUND

With popularization of mobile Internet, more and more terminals each have a plurality of network addresses, and an application server also has a plurality of network addresses. Therefore, actually, there are a plurality of physical paths for multipath information transmission between terminals or between a terminal and a server.

During multipath transmission, a transmission policy needs to be formulated. Specifically, the transmission policy may be at least one of a path manager and a scheduler algorithm, and how to establish a plurality of paths between a plurality of network addresses needs to be determined. This process is referred to as a path manager (PM) in protocol implementation. For example, a terminal A has a wireless fidelity (Wi-Fi) address and a 4G long term evolution (LTE) address, and a terminal B has a Wi-Fi address and a 5G new radio (NR) address. In this case, physical paths that may be used to transmit information between the terminal A and the terminal B include: Wi-Fi-Wi-Fi, Wi-Fi-5G NR, 4G LTE-Wi-Fi, and 4G LTE-5G NR in other words, the terminal A and the terminal B may concurrently transmit information on the foregoing four paths. In addition, during multipath transmission, how to split a series of data packets on different paths for transmission needs to be determined. For example, it is determined whether an aggregated transmission mode or a redundant transmission mode is to be used. For another example, how to aggregate data received on a plurality of paths may be referred to as a scheduler algorithm Scheduler. For example, how a to-be-transmitted 1G data packet is split on the foregoing four paths is determined. In this application, the scheduler algorithm is also referred to as a data scheduling policy.

In existing multipath transmission, usually, because transmission policies are statically set by a transmit end and a receive end separately, flexibility is excessively low, and the transmission policies may not match each other, thereby affecting and restricting transmission performance of multipath transmission.

SUMMARY

Embodiments of this application provide a data transmission method, to resolve a problem that when a multipath transmission technology is used to transmit data, a data transmission policy cannot be negotiated between transceiver devices based on a requirement, thereby limiting transmission performance and causing poor user experience.

To achieve the foregoing objective, the following technical solutions are used in the embodiments of this application.

According to a first aspect, a data transmission method is provided. The method is used for a multipath connection between a first device and a second device, and the method includes: sending, by the first device, a first packet to the second device, where the first packet includes transmission policy negotiation information, and the transmission policy negotiation information is used to negotiate a transmission policy used when the second device uses the multipath connection; receiving, by the first device, a second packet from the second device, where the second packet includes first policy information, and the first policy information indicates a transmission policy used when the second device uses the multipath connection; and transmitting, by the first device, data with the second device based on the first policy information by using a transmission policy corresponding to the first policy information, where a type of the transmission policy indicated by the first policy information is the same as a type of the transmission policy indicated by the transmission policy negotiation information, and the type of the transmission policy is at least one of a path management policy and a data scheduler policy. "Corresponding" may be understood as matching. For example, "the transmission policy corresponding to the first policy information" may be the transmission policy indicated by the first policy information, may be a transmission policy usually used together with the transmission policy indicated by the first policy information (for example, expected transmission performance can be met when the transmission policies are used together in a specific scenario), or may be a transmission policy that complies with a matching rule and that matches the transmission policy indicated by the first policy information (for example, a preset matching relationship: if the second device uses the transmission policy indicated by the first policy information, the first device uses a transmission policy A, where the transmission policy A may be the same as or different from the transmission policy indicated by the first policy information).

It should be understood that the type of the transmission policy is at least one of the path management policy and the data scheduling policy, to be specific, may be both the path management policy and the data scheduling policy, may be only the data scheduling policy, or may be only the path management policy.

According to the technical solution provided in the first aspect, when using the multipath connection, the first device and the second device may negotiate the transmission policy for a plurality of times as required. For example, the first device and the second device may negotiate the path management policy for one or more times, so that the first device and the second device can better ensure a link establishment success rate. Alternatively, the first device and the second device may negotiate the data scheduling policy for one or more times, so that a relatively high matching degree between the data scheduling policies of the first device and the second device is ensured through data scheduling policy negotiation. Alternatively, the first device and the second device may negotiate both the path management policy and the data scheduling policy, so that the first device and the second device can ensure a relatively high matching degree between the data scheduling policies of the first device and the second device while ensuring a link establishment success rate, thereby improving data transmission performance and user experience.

In a possible implementation, the transmission policy negotiation information includes at least one of second policy information, third policy information, and fourth policy information: and the second policy information indicates a transmission policy used when the first device uses the multipath connection to transmit data, the third policy information indicates a transmission policy used when the first device establishes the multipath connection used by the second device to transmit data, and the fourth policy information indicates at least one transmission policy that can be used by the first device. When negotiating the transmission policy, the first device and the second device may notify each other of a transmission policy used by the first device or the second device, a transmission policy supported by the first device or the second device, or a transmission policy expected to be used by the second device or the first device, so that the second device and the first device can select, based on requirements of the second device and the first device, a transmission policy that matches the requirements, thereby improving data transmission performance.

In a possible implementation, the path management policy indicates a policy for establishing at least one path of the multipath connection between the first device and the second device, and the data scheduling policy indicates a policy for allocating data on the multipath connection during data transmission. The first device and the second device may improve the link establishment success rate between the first device and the second device by negotiating the path management policy, and/or improve the matching degree between the data scheduling policies of the first device and the second device by negotiating the data scheduling policy. In this way, data transmission performance can be better improved, thereby improving user experience.

In a possible implementation, the first packet and the second packet each include a first extension bit, the transmission policy negotiation information is located in the first extension bit of a packet header of the first packet, and the first policy information is located in the first extension bit of a packet header of the second packet. The first device and the second device each carry the transmission policy negotiation information and the first policy information by using the extension bit, thereby resolving a problem in an existing technology that a multipath transmission protocol does not support transmission policy negotiation.

In a possible implementation, the first packet further includes first indication information, and the first indication information is used to indicate that the first packet includes the transmission policy negotiation information. The first device may include indication information to a packet, to notify the second device that the packet includes the transmission policy negotiation information, so that a negotiation process is smoother.

In a possible implementation, the second packet further includes second indication information, and the second indication information is used to indicate that the second packet includes the first policy information. The second device may include indication information to a packet, to notify the first device that the packet includes the transmission policy negotiation information, so that a negotiation process is smoother.

In a possible implementation, the first packet and the second packet each include a second extension bit, the first indication information is located in the second extension bit of the first packet, and the second indication information is located in the second extension bit of the packet header of the second packet. The first device and the second device each carry the indication information by using the extension bit, thereby resolving a problem in an existing technology that a multipath transmission protocol does not support transmission policy negotiation.

In a possible implementation, the first extension bit is a control request extension bit, and the second extension bit is a subtype extension bit. The first device and the second device each carry the indication information and the transmission policy negotiation information by using the extension bit, thereby resolving a problem in an existing technology that a multipath transmission protocol does not support transmission policy negotiation.

In a possible implementation, the method may further include: determining, by using a protocol stack of the first device, the transmission policy negotiation information based on a data transmission requirement of an application corresponding to the multipath connection. The first device and the second device may initiate transmission policy negotiation based on the data transmission requirement of the application, and determine respectively used transmission policies based on specific requirements, so that a link establishment result and a data scheduling policy can better meet the specific requirements, and user experience is better.

In a possible implementation, the multipath connection is a multipath transmission control protocol (MPTCP) connection or a multipath quick user data packet internet connection (MPQUIC) connection. Transmission policy negotiation in this application may be implemented on a plurality of multipath transmission protocols in an open source manner, thereby resolving a problem in an existing technology that the multipath transmission protocol does not support transmission policy negotiation.

In a possible implementation, both the first packet and the second packet are data packets, or both the first packet and the second packet are control packets in a data transmission process. The first device and the second device may support transmission policy negotiation performed by using the extension bit of the data packet and the extension bit of the control packet, thereby resolving a problem in an existing technology that a multipath transmission protocol does not support transmission policy negotiation. In addition, in a data transmission process, the first device and the second device can implement negotiation based on a requirement by using either the data packet or the control packet, so that flexibility is higher and implementation is easier.

In a possible implementation, both the first packet and the second packet are handshake packets; and the handshake packet is a handshake packet used by the first device and the second device to establish a primary subflow, or the handshake packet is a handshake packet used by the first device and the second device to establish a subflow other than the primary subflow. The first device and the second device may support transmission policy negotiation performed by using an extension bit of the handshake packet in a link establishment phase, thereby resolving a problem in an existing technology that a multipath transmission protocol does not support transmission policy negotiation. In addition, the first device and the second device may negotiate the transmission policy based on a requirement in the link establishment phase, so that data transmission performance in an entire data transmission process can be ensured.

In a possible implementation, the handshake packet is sent by the first device to the second device in an MP_CAPABLE phase when the first device establishes a connection to the second device or in an MP_JOIN phase when the first device establishes a connection to the second device. The first device and the second device can negotiate the transmission policy by using an extension bit of the handshake packet in the MP_CAPABLE phase or an extension bit of the handshake packet in the MP_JOIN phase, so that flexibility is higher.

According to a second aspect, a data transmission method is provided. The method is used for a multipath connection between a first device and a second device, and the method includes: receiving, by the second device, a first packet from the first device, where the first packet includes transmission policy negotiation information, and the transmission policy negotiation information is used to negotiate a transmission policy used when the second device uses the multipath connection; and transmitting, by the second device, data with the first device by using a transmission policy corresponding to the transmission policy negotiation information, where a type of the transmission policy is at least one of a path management policy and a data scheduling policy. "Corresponding" may be understood as matching. For example, "the transmission policy corresponding to the transmission policy negotiation information" may be the transmission policy indicated by the transmission policy negotiation information, may be a transmission policy usually used together with the transmission policy indicated by the transmission policy negotiation information (for example, expected transmission performance can be met when the transmission policies are used together in a specific scenario), or may be a transmission policy that complies with a matching rule and that matches the transmission policy indicated by the transmission policy negotiation information (for example, a preset matching relationship: if the transmission policy negotiation information indicates a transmission policy B, the second device uses a transmission policy C, where the transmission policy C may be the same as or different from the transmission policy B).

It should be understood that the type of the transmission policy is at least one of the path management policy and the data scheduling policy, to be specific, may be both the path management policy and the data scheduling policy, may be only the data scheduling policy, or may be only the path management policy.

According to the technical solution provided in the second aspect, when using the multipath connection, the second device and the first device may negotiate the path management policy for one or more times as required, so that the second device and the first device can better ensure a link establishment success rate, and/or negotiate the data scheduling policy for one or more times. This ensures a matching degree between the data scheduling policies of the second device and the first device, thereby improving data transmission performance and user experience.

In a possible implementation, the method may further include: sending, by the second device, a second packet to the first device based on the first packet, where the second packet includes first policy information, and the first policy information indicates a transmission policy used when the second device uses the multipath connection. The second device feeds back, to the first device during transmission policy negotiation, the transmission policy used when the second device uses the multipath connection, so that the second device and the first device can better ensure the link establishment success rate, and/or ensure the matching degree between the data scheduling policies of the second device and the first device, thereby improving data transmission performance.

In a possible implementation, the transmission policy negotiation information includes at least one of second policy information, third policy information, and fourth policy information: and the second policy information indicates a transmission policy used when the first device uses the multipath connection to transmit data, the third policy information indicates a transmission policy used when the first device establishes the multipath connection used by the second device to transmit data, and the fourth policy information indicates at least one transmission policy that can be used by the first device. When negotiating the transmission policy, the first device and the second device may notify each other of a transmission policy used by the first device or the second device, a transmission policy supported by the first device or the second device, or a transmission policy expected to be used by the second device or the first device, so that the second device and the first device can select, based on requirements of the second device and the first device, a transmission policy that matches the requirements, thereby improving data transmission performance.

In a possible implementation, the method may further include: determining, by the second device, first policy information based on the transmission policy negotiation information, where the first policy information indicates a transmission policy used when the second device uses the multipath connection, and a type of the transmission policy indicated by the first policy information is the same as a type of the transmission policy indicated by the transmission policy negotiation information. The second device may determine, based on the transmission policy indicated by the transmission policy negotiation information, the transmission policy used when the second device uses the multipath connection, so that the determined first policy information can better match a transmission requirement of the first device, thereby improving data transmission performance.

In a possible implementation, the transmission policy negotiation information includes third policy information; and when the second device can use a transmission policy indicated by the third policy information, the determining, by the second device, first policy information based on the transmission policy negotiation information may include: determining, by the second device, that the transmission policy indicated by the first policy information is the transmission policy indicated by the third policy information. The second device may transmit data by using a transmission policy suggested by the first device, so that the determined first policy information can better match a transmission requirement of the first device.

In a possible implementation, the transmission policy negotiation information further includes fourth policy information; and when the second device cannot use a transmission policy indicated by the third policy information, the determining, by the second device, first policy information based on the transmission policy negotiation information may include: determining, by the second device, that the transmission policy indicated by the first policy information is a transmission policy that can be used by the second device and that has performance similar to that of the transmission policy indicated by the third policy information; or determining, by the second device, that the transmission policy indicated by the first policy information is a transmission policy indicated by the fourth policy information. The second device may transmit data by using a transmission policy that has performance similar to that of any transmission policy supported by the first device, so that when a transmission requirement of the first device cannot be fully matched, a matching degree between the two transmission policies is increased as much as possible.

In a possible implementation, the transmission policy negotiation information includes the second policy information; and when the second device can use a transmission policy indicated by the second policy information, the determining, by the second device, first policy information based on the transmission policy negotiation information may include: determining, by the second device, that the transmission policy indicated by the first policy information is the transmission policy indicated by the second policy information. The second device may transmit data by using a transmission policy that is being used by the first device, so that the determined first policy information can better match a transmission requirement of the first device.

In a possible implementation, the transmission policy negotiation information further includes fourth policy information; and when the second device cannot use a transmission policy indicated by the second policy information, the determining, by the second device, first policy information based on the transmission policy negotiation information may include: determining, by the second device, that the transmission policy indicated by the first policy information is a transmission policy that can be used by the second device and that has performance similar to that of the transmission policy indicated by the second policy information; or determining, by the second device, that the transmission policy indicated by the first policy information is a transmission policy indicated by the fourth policy information. The second device may transmit data by using a transmission policy that has performance similar to that of any transmission policy supported by the first device, so that when a transmission requirement of the first device cannot be fully matched, a matching degree between the two transmission policies is increased as much as possible.

In a possible implementation, the path management policy has a feature the same as that of the path management policy described in any possible implementation of the first aspect, and the data scheduling policy has a feature the same as that of the data scheduling policy described in any possible implementation of the first aspect. For details, refer to the possible implementations of the first aspect.

In a possible implementation, the first packet and the second packet have features the same as those of the first packet and the second packet described in any possible implementation of the first aspect. For details, refer to the possible implementations of the first aspect.

In a possible implementation, the multipath connection may be the multipath connection described in any possible implementation of the first aspect, and includes an MPTCP connection or an MPQUIC connection. For details, refer to the possible implementations of the first aspect.

According to a third aspect, a first device is provided. The first device establishes a multipath connection to a second device, and the first device includes: a sending module, configured to send a first packet to the second device, where the first packet includes transmission policy negotiation information, and the transmission policy negotiation information is used to negotiate a transmission policy used when the second device uses the multipath connection; and a receiving module, configured to receive a second packet from the second device, where the second packet includes first policy information, and the first policy information indicates a transmission policy used when the second device uses the multipath connection. The sending module and the receiving module are further configured to transmit data with the second device based on the first policy by using a transmission policy corresponding to the first policy information. A type of the transmission policy indicated by the first policy information is the same as a type of the transmission policy indicated by the transmission policy negotiation information, and the type of the transmission policy is at least one of a path management policy and a data scheduling policy. "Corresponding" may be understood as matching. For example, "the transmission policy corresponding to the first policy information" may be the transmission policy indicated by the first policy information, may be a transmission policy usually used together with the transmission policy indicated by the first policy information (for example, expected transmission performance can be met when the transmission policies are used together in a specific scenario), or may be a transmission policy that complies with a matching rule and that matches the transmission policy indicated by the first policy information (for example, a preset matching relationship: if the second device uses the transmission policy indicated by the first policy information, the first device uses a transmission policy A, where the transmission policy A may be the same as or different from the transmission policy indicated by the first policy information).

It should be understood that the type of the transmission policy is at least one of the path management policy and the data scheduling policy, to be specific, may be both the path management policy and the data scheduling policy, may be only the data scheduling policy, or may be only the path management policy.

According to the technical solution provided in the third aspect, when using the multipath connection, the first device and the second device may negotiate the transmission policy for a plurality of times as required. For example, the first device and the second device may negotiate the path management policy for one or more times, so that the first device and the second device can better ensure a link establishment success rate. Alternatively, the first device and the second device may negotiate the data scheduling policy for one or more times, so that a relatively high matching degree between the data scheduling policies of the first device and the second device is ensured through data scheduling policy negotiation. Alternatively, the first device and the second device may negotiate both the path management policy and the data scheduling policy, so that the first device and the second device can ensure a relatively high matching degree between the data scheduling policies of the first device and the second device while ensuring a link establishment success rate, thereby improving data transmission performance and user experience.

In a possible implementation, the transmission policy negotiation information includes at least one of second policy information, third policy information, and fourth policy information; and the second policy information indicates a transmission policy used when the first device uses the multipath connection to transmit data, the third policy information indicates a transmission policy used when the first device establishes the multipath connection used by the second device to transmit data, and the fourth policy information indicates at least one transmission policy that can be used by the first device. When negotiating the transmission policy, the first device and the second device may notify each other of a transmission policy used by the first device or the second device, a transmission policy supported by the first device or the second device, or a transmission policy expected to be used by the second device or the first device, so that the second device and the first device can select, based on requirements of the second device and the first device, a transmission policy that matches the requirements, thereby improving data transmission performance.

In a possible implementation, the path management policy indicates a policy for establishing at least one path of the multipath connection between the first device and the second device, and the data scheduling policy indicates a policy for allocating data on the multipath connection during data transmission. The first device and the second device may improve the link establishment success rate between the first device and the second device by negotiating the path management policy, and/or improve the matching degree between the data scheduling policies of the first device and the second device by negotiating the data scheduling policy. In this way, data transmission performance can be better improved, thereby improving user experience.

In a possible implementation, the first packet and the second packet each include a first extension bit, the transmission policy negotiation information is located in the first extension bit of a packet header of the first packet, and the first policy information is located in the first extension bit of a packet header of the second packet. The first device and the second device each carry the transmission policy negotiation information and the first policy information by using the extension bit, thereby resolving a problem in an existing technology that a multipath transmission protocol does not support transmission policy negotiation.

In a possible implementation, the first packet further includes first indication information, and the first indication information is used to indicate that the first packet includes the transmission policy negotiation information. The first device may include indication information to a packet, to notify the second device that the packet includes the transmission policy negotiation information, so that a negotiation process is smoother.

In a possible implementation, the second packet further includes second indication information, and the second indication information is used to indicate that the second packet includes the first policy information. The second device may include indication information to a packet, to notify the first device that the packet includes the transmission policy negotiation information, so that a negotiation process is smoother.

In a possible implementation, the first packet and the second packet each include a second extension bit, the first indication information is located in the second extension bit of the first packet, and the second indication information is located in the second extension bit of the packet header of the second packet. The first device and the second device each carry the indication information by using the extension bit, thereby resolving a problem in an existing technology that a multipath transmission protocol does not support transmission policy negotiation.

In a possible implementation, the first extension bit is a control request extension bit, and the second extension bit is a subtype extension bit. The first device and the second device each carry the indication information and the transmission policy negotiation information by using the extension bit, thereby resolving a problem in an existing technology that a multipath transmission protocol does not support transmission policy negotiation.

In a possible implementation, the first device may further include an analysis module, configured to determine, by using a protocol stack of the first device, the transmission policy negotiation information based on a data transmission requirement of an application corresponding to the multipath connection. The first device and the second device may initiate transmission policy negotiation based on the data transmission requirement of the application, and determine respectively used transmission policies based on specific requirements, so that a link establishment result and a data scheduling policy can better meet the specific requirements, and user experience is better.

In a possible implementation, the multipath connection is a multipath transmission control protocol (MPTCP) connection or a multipath quick user data packet internet connection (MPQUIC) connection. Transmission policy negotiation in this application may be implemented on a plurality of multipath transmission protocols in an open source manner, thereby resolving a problem in an existing technology that the multipath transmission protocol does not support transmission policy negotiation.

In a possible implementation, both the first packet and the second packet are data packets, or both the first packet and the second packet are control packets in a data transmission process. The first device and the second device may support transmission policy negotiation performed by using the extension bit of the data packet and the extension bit of the control packet, thereby resolving a problem in an existing technology that a multipath transmission protocol does not support transmission policy negotiation. In addition, in a data transmission process, the first device and the second device can implement negotiation based on a requirement by using either the data packet or the control packet, so that flexibility is higher and implementation is easier.

In a possible implementation, both the first packet and the second packet are handshake packets; and the handshake packet is a handshake packet used by the first device and the second device to establish a primary subflow, or the handshake packet is a handshake packet used by the first device and the second device to establish a subflow other than the primary subflow. The first device and the second device may support transmission policy negotiation performed by using an extension bit of the handshake packet in a link establishment phase, thereby resolving a problem in an existing technology that a multipath transmission protocol does not support transmission policy negotiation. In addition, the first device and the second device may negotiate the transmission policy based on a requirement in the link establishment phase, so that data transmission performance in an entire data transmission process can be ensured.

In a possible implementation, the handshake packet is sent by the first device to the second device in an MP_CAPABLE phase when the first device establishes a connection to the second device or in an MP_JOIN phase when the first device establishes a connection to the second device. The first device and the second device can negotiate the transmission policy by using an extension bit of the handshake packet in the MP_CAPABLE phase or an extension bit of the handshake packet in the MP_JOIN phase, so that flexibility is higher.

According to a fourth aspect, a second device is provided. The second device establishes a multipath connection to a first device, and the second device includes: a receiving module, configured to receive a first packet from the first device, where the first packet includes transmission policy negotiation information, and the transmission policy negotiation information is used to negotiate a transmission policy used when the second device uses the multipath connection; and a sending module, configured to send data to the first device by using a transmission policy corresponding to the transmission policy negotiation information. The receiving module is further configured to receive data from the first device by using the transmission policy corresponding to the transmission policy negotiation information. A type of the transmission policy is at least one of a path management policy and a data scheduling policy. "Corresponding" may be understood as matching. For example, "the transmission policy corresponding to the transmission policy negotiation information" may be the transmission policy indicated by the transmission policy negotiation information, may be a transmission policy usually used together with the transmission policy indicated by the transmission policy negotiation information (for example, expected transmission performance can be met when the transmission policies are used together in a specific scenario), or may be a transmission policy that complies with a matching rule and that matches the transmission policy indicated by the transmission policy negotiation information (for example, a preset matching relationship: if the transmission policy negotiation information indicates a transmission policy B, the second device uses a transmission policy C, where the transmission policy C may be the same as or different from the transmission policy B).

It should be understood that the type of the transmission policy is at least one of the path management policy and the data scheduling policy, to be specific, may be both the path management policy and the data scheduling policy, may be only the data scheduling policy, or may be only the path management policy.

According to the technical solution provided in the fourth aspect, when using the multipath connection, the second device and the first device may negotiate the path management policy for one or more times as required, so that the second device and the first device can better ensure a link establishment success rate, and/or negotiate the data scheduling policy for one or more times. This ensures a matching degree between the data scheduling policies of the second device and the first device, thereby improving data transmission performance and user experience.

In a possible implementation, the sending module is further configured to send a second packet to the first device based on the first packet, where the second packet includes first policy information, and the first policy information indicates a transmission policy used when the second device uses the multipath connection. The second device feeds back, to the first device during transmission policy negotiation, the transmission policy used when the second device uses the multipath connection, so that the second device and the first device can better ensure the link establishment success rate, and/or ensure the matching degree between the data scheduling policies of the second device and the first device, thereby improving data transmission performance.

In a possible implementation, the transmission policy negotiation information includes at least one of second policy information, third policy information, and fourth policy information; and the second policy information indicates a transmission policy used when the first device uses the multipath connection to transmit data, the third policy information indicates a transmission policy used when the first device establishes the multipath connection used by the second device to transmit data, and the fourth policy information indicates at least one transmission policy that can be used by the first device. When negotiating the transmission policy, the first device and the second device may notify each other of a transmission policy used by the first device or the second device, a transmission policy supported by the first device or the second device, or a transmission policy expected to be used by the second device or the first device, so that the second device and the first device can select, based on requirements of the second device and the first device, a transmission policy that matches the requirements, thereby improving data transmission performance.

In a possible implementation, the second device further includes an analysis module, configured to determine first policy information based on the transmission policy negotiation information, where the first policy information indicates a transmission policy used when the second device uses the multipath connection, and a type of the transmission policy indicated by the first policy information is the same as a type of the transmission policy indicated by the transmission policy negotiation information. The second device may determine, based on the transmission policy indicated by the transmission policy negotiation information, the transmission policy used when the second device uses the multipath connection, so that the determined first policy information can better match a transmission requirement of the first device, thereby improving data transmission performance.

In a possible implementation, the transmission policy negotiation information includes third policy information; and when the second device can use a transmission policy indicated by the third policy information, the determining, by the analysis module, first policy information based on the transmission policy negotiation information may include: determining, by the analysis module, that the transmission policy indicated by the first policy information is the transmission policy indicated by the third policy information. The second device may transmit data by using a transmission policy suggested by the first device, so that the determined first policy information can better match a transmission requirement of the first device.

In a possible implementation, the transmission policy negotiation information further includes fourth policy information; and when the second device cannot use a transmission policy indicated by the third policy information, the determining, by the analysis module, first policy information based on the transmission policy negotiation information may include, determining, by the analysis module, that the transmission policy indicated by the first policy information is a transmission policy that can be used by the second device and that has performance similar to that of the transmission policy indicated by the third policy information; or determining, by the analysis module, that the transmission policy indicated by the first policy information is a transmission policy indicated by the fourth policy information. The second device may transmit data by using a transmission policy that has performance similar to that of any transmission policy supported by the first device, so that when a transmission requirement of the first device cannot be fully matched, a matching degree between the two transmission policies is increased as much as possible.

In a possible implementation, the transmission policy negotiation information includes second policy information; and when the second device can use a transmission policy indicated by the second policy information, the determining, by the analysis module, first policy information based on the transmission policy negotiation information may include: determining, by the analysis module, that the transmission policy indicated by the first policy information is the transmission policy indicated by the second policy information. The second device may transmit data by using a transmission policy that is being used by the first device, so that the determined first policy information can better match a transmission requirement of the first device.

In a possible implementation, the transmission policy negotiation information further includes fourth policy information; and when the second device cannot use a transmission policy indicated by the second policy information, the determining, by the analysis module, first policy information based on the transmission policy negotiation information may include determining, by the analysis module, that the transmission policy indicated by the first policy information is a transmission policy that can be used by the second device and that has performance similar to that of the transmission policy indicated by the second policy information; or determining, by the analysis module, that the transmission policy indicated by the first policy information is a transmission policy indicated by the fourth policy information. The second device may transmit data by using a transmission policy that has performance similar to that of any transmission policy supported by the first device, so that when a transmission requirement of the first device cannot be fully matched, a matching degree between the two transmission policies is increased as much as possible.

In a possible implementation, the path management policy has a feature the same as that of the path management policy described in any possible implementation of the third aspect, and the data scheduling policy has a feature the same as that of the data scheduling policy described in any possible implementation of the third aspect. For details, refer to the possible implementations of the third aspect.

In a possible implementation, the first packet and the second packet have features the same as those of the first packet and the second packet described in any possible implementation of the third aspect. For details, refer to the possible implementations of the third aspect.

In a possible implementation, the multipath connection may be the multipath connection described in any possible implementation of the third aspect, and includes an MPTCP connection or an MPQUIC connection. For details, refer to the possible implementations of the third aspect.

According to a fifth aspect, a first device is provided. The first device may include a storage medium, configured to store computer program code, where the computer program code includes an instruction; a radio frequency circuit, configured to send and receive a radio signal; and a processing circuit, configured to execute the instruction in the storage medium, so that the first device performs the method and the functions in any possible implementation of the first aspect.

According to a sixth aspect, a second device is provided. The second device may include a storage medium, configured to store computer program code, where the computer program code includes an instruction; a radio frequency circuit, configured to send and receive a radio signal; and a processing circuit, configured to execute the instruction in the storage medium, so that the second device performs the method and the functions in any possible implementation of the second aspect.

According to a seventh aspect, a computer-readable storage medium is provided. The computer-readable storage medium stores a computer execution instruction, and when the computer execution instruction is executed by a processing circuit, the data transmission method in any possible implementation of the first aspect and the second aspect is implemented.

According to an eighth aspect, a chip system is provided. The chip system includes a processing circuit and a storage medium, where the storage medium stores an instruction; and when the instruction is executed by the processing circuit, the data transmission method in any implementation of the first aspect or the second aspect is implemented. The chip system may include a chip, or may include a chip and another discrete component.

BRIEF DESCRIPTION OF DRAWINGS

FIG. 12 is an example 6 of a format of a first packet according to an embodiment of this application;

FIG. 13 is an example 7 of a format of a first packet according to an embodiment of this application;

DESCRIPTION OF EMBODIMENTS

Figure 1A:
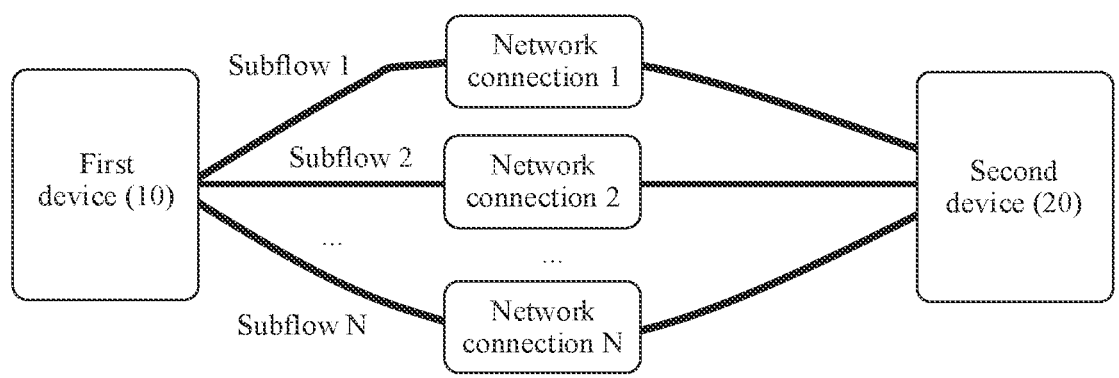
FIG. 1A is a schematic diagram of an application scenario of a data transmission method according to an embodiment of this application.

Embodiments of this application provide a data transmission method. The method is used in a process of transmitting data between devices by using a multipath connection. The process of transmitting the data by using the multipath connection may include: a process of establishing the multipath connection between the devices, and a process of transmitting data by using the multipath connection after the establishment of the multipath connection is completed. Specifically, a first device and a second device may use a multipath transmission protocol to negotiate, in a process of establishing a multipath connection or a process of transmitting data by using the multipath connection, a transmission policy used by the two parties to transmit the data. A type of the transmission policy in the embodiments of this application may be at least one of a path management policy and a data scheduling policy.

For example, the multipath transmission protocol in the embodiments of this application may be a multipath transmission control protocol (MPTCP), a multipath user datagram protocol (MPUDP), or a multipath quick user datagram protocol Internet connection (MPQUIC).

The following explains terms that may appear in the embodiments of this application.

Path: A path is a link between a transmit end (or a sender) and a receive end (or a receiver). The path may be identified by using a four-tuple, and the four-tuple is used to indicate a pair of a source address (and/or port) and a destination address (and/or port). It should be understood that both a receive end and a transmit end that support a multipath transmission technology may prepare a plurality of addresses on hosts of the receive end and the transmit end, to identify a plurality of paths. In addition, a plurality of paths between a pair of a receive end and a transmit end may share one or more routers.

Subflow: A subflow is a flow of a TCP segment running on a single path. The subflow is a part of a multipath connection. A start and a termination of the subflow are similar to those of a regular TCP connection. In this specification, one subflow corresponds to one path.

It should be noted that, for one subflow, devices at a transmit end and a receive end may use operator identifiers in different expression forms to represent a same operator. For example, for one subflow, the transmit end uses a number to represent an operator, and the receive end uses an operator name to represent the operator.

Multipath connection: A multipath connection is a group of subflows on which two hosts (host) may communicate with each other over an application, and the group of subflows include a plurality of subflows. Connections are in one-to-one mapping to sockets of applications. The multipath connection is a connection whose data is transmitted by using a plurality of paths. Each path (in other words, each subflow) may use different transmission protocols. For example, if a path uses a TCP protocol, the multipath connection is an MPTCP connection. A link on which two hosts may communicate with each other over an application is also referred to as a connection. The multipath connection includes a plurality of paths, while a common connection has only one path.

Packet: A packet is a package of data having a header, and the header may be logically complete or incomplete. Usually, the packet is physical packaging of data, and certainly, may be logical packaging of data. The concept of the packet is used to describe data interaction between a host and a network connected to the host.

Acknowledgment (ACK) packet: An ACK packet is also referred to as an acknowledgment packet, an ACK, a feedback packet, or a notification. The acknowledgment packet includes ACK information, for example, a sequence number of a data packet, and is usually used to indicate that a receive end notifies a transmit end that the data packet has been received.

For related content of a host, a path, a link, and a subflow, refer to RFC.6824 of the IETF standard organization.

Round trip time (RTT): An RTT indicates a latency that a transmit end undergoes from sending of data to receiving of reception acknowledgment information (for example, an ACK) that is corresponding to the data and that is sent by a receive end. It should be understood that in an implementation, the receive end immediately sends the acknowledgment information corresponding to the data after receiving the data. "Immediate" should be understood as including a necessary processing time from receiving the data to sending an acknowledgment message by the receive end. It should be understood that the round trip time may be abbreviated as RTT or rtt. For example, the round trip time is represented as rtt in some code.

First device/Second device: A first device/a second device is a physical device or a virtual device. The physical device is a device that actually exists. The virtual device is a device represented by a plurality of corresponding logical devices that change from the physical device. The logical device is a device that has a mapping relationship with the physical device, and is a device that includes a logical element and may perform a logical operation (AND, OR, NOT, or the like). The mapping relationship may include a logical device name, a physical device name, and a device driver entry.

In some scenarios, the first device and the second device may be on a same physical device or in a same cluster.

FIG. 1A is a schematic architectural diagram of a communications system according to an embodiment of this application. The communications system may include a first device 10 and a second device 20. The first device 10 and the second device 20 each include a plurality of network addresses. As shown in FIG. 1A, the first device 10 and the second device 20 may establish a plurality of network connections by using a plurality of network addresses of each other, for example, a network connection 1, a network connection 2, . . . , and a network connection N. The first device 10 and the second device 20 may perform multipath data transmission through the plurality of network connections.

Specifically, the first device 10 and the second device 20 may split to-be-transmitted data into a plurality of subflows. Each subflow corresponds to one path, and each network connection connects one path between the first device 10 and the second device 20.

Each subflow may be transmitted by using a same transmission protocol or different transmission protocols. For example, the transmission protocol may be a transmission control protocol (TCP), a stream control transmission protocol (SCTP), or a quick user datagram protocol Internet connections (QUIC).

It should be noted that the first device 10 and the second device 20 may negotiate a transmission policy in a process of establishing the N network connections or in a process of transmitting data through the established N network connections.

The network connection may be a Wi-Fi connection, a cellular connection (for example, a 4G LTE connection, a 5G NR connection, a 3G connection, a code division multiple access (CDMA) connection, or a 2G connection), a Bluetooth connection, a data transmission line, near field communication (NFC), an infrared connection, a light fidelity (Li-Fi) technology, or the like, or may be another wireless connection or wired connection. This is not limited in this application.

It should be noted that the transmission policy negotiation may be initiated by a transmit end of multipath data transmission, or may be initiated by a receive end of multipath data transmission. This is not limited in this application.

The first device 10 and the second device 20 each may be an electronic device with a wireless communication function, and include a desktop device, a laptop device, a handheld device, an in-vehicle user equipment (UE) device, and the like, for example, a smartphone, a cellular phone, a smartwatch, a desktop computer, a tablet computer, a smart TV box, an ultra-mobile personal computer (UMPC), a netbook, a personal digital assistant (PDA), a portable multimedia player (PMP), a dedicated media player, a consumer electronic device, a wearable device, an augmented reality (AR)/virtual reality (VR) device, and other types of electronic devices. The first device 10 may be alternatively a network element that supports a multipath transmission protocol, including a network side device such as a gateway, an access router, a core router, a front-end router, or a load balancer. The first device 10 may be alternatively a cloud device that supports a multipath transmission protocol, for example, a cloud server. The cloud server may be an application server, and data of a plurality of applications may run on one application server. Some large companies have a plurality of applications. For example. Google has a plurality of applications such as Google Maps and Google Search. Tencent has a variety of game applications, and further has Tencent Video, WeChat, QQ Music, and the like. Applications of a same company may share a server. Emergence of a cloud platform and a cloud service may enable a plurality of applications belonging to different companies to run on one application server. In other words, one application server may serve as a server of a plurality of applications, and some applications may share some network addresses.

It should be noted that the first device 10 and the second device 20 may be devices of a same type. For example, the first device 10 and the second device 20 each may be a device of a communication terminal type, such as a mobile phone, a smartwatch, a desktop computer, a tablet computer, a smart TV box, an UMPC, a netbook, a PDA, or a PMP. The first device 10 and the second device 20 may be alternatively devices of different types. For example, when the first device 10 is a device of a communication terminal type, the second device 20 may be a network side device, such as a gateway, an application server, an access router, a core router, a front-end router, or a load balancer.

Figure 1B:
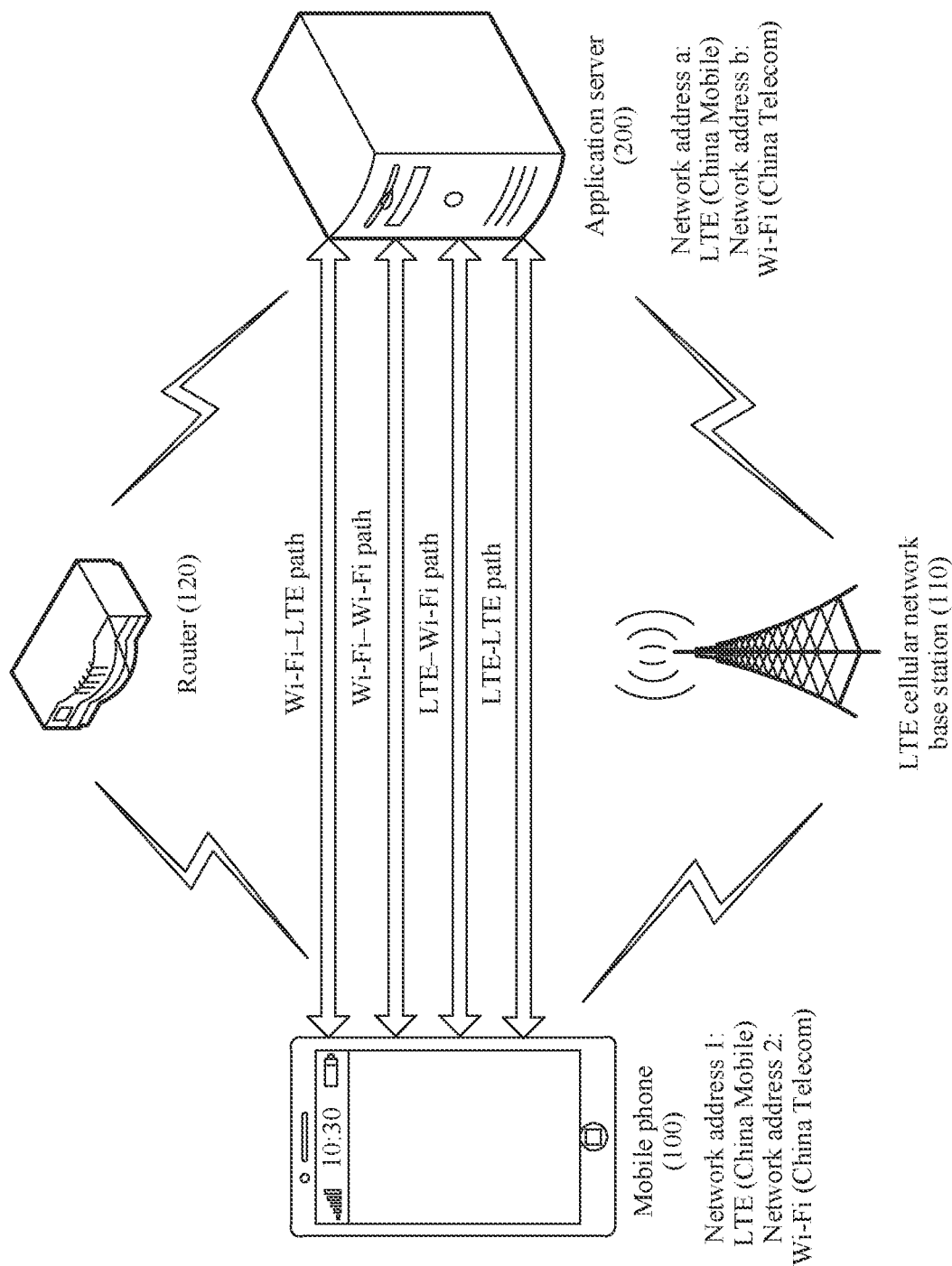
FIG. 1B is a schematic diagram of an example of a communications network architecture of a data transmission method according to an embodiment of this application.

For example, FIG. 1B is a schematic diagram of an example of a communications network architecture of a data transmission method according to an embodiment of this application. The first device 10 may be a mobile phone 100 shown in FIG. 1B, and the second device 20 may be an application server 200 shown in FIG. 1B. For example, it is assumed that the application server 200 is a mail server, and an application client (for example, a 126 mailbox) is installed on the mobile phone 100. The mobile phone 100 may periodically obtain updated email information from the application server 200.

The mobile phone 100 and the application server 200 may establish, by using different network nodes, a plurality of paths used for transmitting email data. Specifically, the network node may be an access point (AP) of a Wi-Fi network, a router, an access point of a Winmax network, a base station of a wireless cellular mobile network, or the like. A type of a wireless network and a specific form of an access node of the wireless network are not limited in the present invention. In addition, wireless networks of a same type are access nodes belonging to a same Wi-Fi network or a same Winmax network, or access nodes belonging to a same wireless cellular network such as a 2G network, a 3G network, a 4G network, or a 5G network.

For example, as shown in FIG. 1B, the mobile phone 100 and the application server 200 may establish the plurality of paths by using two network nodes (including a router 120 and an LTE cellular network base station 110), to carry the foregoing subflow. Corresponding to the router 120 and the LTE cellular network base station 110, as shown in FIG. 1B, the mobile phone 100 has two network addresses: a network address 1 and a network address 2. The network address 1 is an LTE cellular address of China Mobile, and the network address 2 is a Wi-Fi address of China Telecom. As shown in FIG. 1B, the application server 200 has two network addresses: a network address a and a network address b. The network address a is an LTE cellular address of China Mobile, and the network address b is a Wi-Fi address of China Telecom. A maximum of 2×2=4 paths may be established between the mobile phone 100 and the application server 200, including a path 1 (a Wi-Fi-LTE path), a path 2 (a Wi-Fi-Wi-Fi path), a path 3 (an LTE-Wi-Fi path), and a path 4 (an LTE-LTE path). The path 2 and the path 4 are network connections between network addresses of a same operator, and the path 1 and the path 3 are network connections between network addresses of different operators. To-be-transmitted data may be split into a maximum of four subflows, and the four subflows are separately transmitted from the application server 200 to the mobile phone 100 through the foregoing four paths.

In an application scenario, the mobile phone 100 and the application server 200 may negotiate a transmission policy in a process of establishing a multipath connection. Specifically, the mobile phone 100 may send a request message to the application server 200, to request to establish the multipath connection to the application server 200. The request message carries transmission policy negotiation information. The transmission policy negotiation information is used to negotiate, with the application server 200, a transmission policy used for multipath data transmission. The transmission policy may include a path management policy and/or a data scheduling policy. The mobile phone 100 and the application server 200 may negotiate the transmission policy based on one or more transmission parameters such as a transmission rate, a latency, a packet loss rate, and a throughput rate. The transmission parameters include but are not limited to the transmission rate, the latency, the packet loss rate, and the throughput rate.

The path manager (PM) policy is used to indicate a mechanism in which the mobile phone 100 and the application server 200 establish a plurality of paths based on a plurality of respective network addresses. For example, the PM policy may indicate a specific manner and a process of establishing a path by the mobile phone 100 and the application server 200, and a quantity of paths. Based on the foregoing example, a maximum of four paths may be established between the mobile phone 100 and the application server 200. However, when the mobile phone 100 and the application server 200 perform multipath data transmission, a specific quantity of paths that need to be established may be determined based on a specific situation. For example, the specific quantity of paths may be determined based on the foregoing transmission parameters (such as the transmission rate, the latency, the packet loss rate, and the throughput rate).

The data scheduler policy is used to indicate a mechanism in which the mobile phone 100 and the application server 200 perform data scheduling based on the established path. For example, the scheduler policy may indicate a specific split ratio, a quantity of subflows, an aggregation manner, and a dynamic adjustment mechanism that are of subflows into which to-be-transmitted data is split by the mobile phone 100 and the application server 200.

Figure 2A:
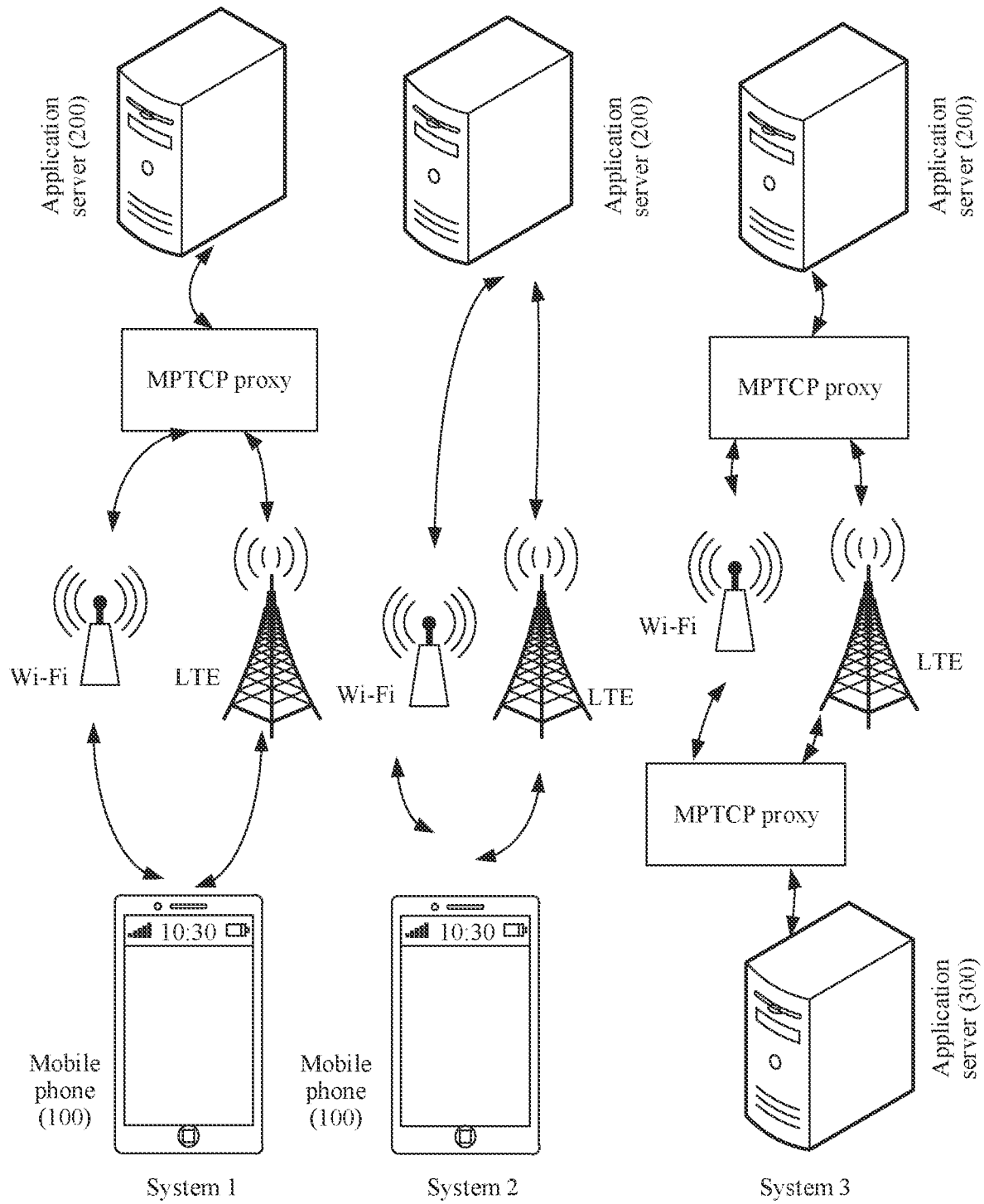
FIG. 2A shows three networking systems to which embodiments of this application can be applied according to an embodiment of this application.

A multipath transmission technology may be applied to a plurality of networking systems. Generally, if information needs to be transmitted by using the multipath transmission technology, at least one link between a transmit end and a receive end of the information should support the multipath transmission technology. FIG. 2A simply lists three networking systems that can use the technology. For ease of description. FIG. 2A schematically shows two paths in a multipath system, and a Wi-Fi technology and an LTE network are separately used.

In a system 1 in FIG. 2A, a mobile phone 100 supports a multipath transmission technology, but an application server 200 does not support the technology. To enable the application server 200 to perform multipath data transmission with the mobile phone 100, in this embodiment of this application, a prow device (referred to as an MPTCP proxy, for example, a gateway) that supports the multipath transmission technology may be disposed for the application server 200 in the system 1. In this way, the application server 200 can perform multipath data transmission with the mobile phone 100 by using the MPTCP proxy.

In a system 2 in FIG. 2A, both a mobile phone 100 and an application server 200 support the multipath transmission technology. The application server 200 may perform multipath data transmission with the mobile phone 100 by using the multipath transmission technology.

In a system 3 in FIG. 2A, a scenario in which an application server 200 communicates with an application server 300 is described. The two clouds can support the multipath transmission technology, or at least one of the two clouds does not support the technology, and one cloud that does not support the technology may use a proxy device (for example, a gateway) that supports the multipath transmission technology. For example, in the system 3 shown in FIG. 2A, two application servers each use an MPTCP proxy, so that the application server 200 and the application server 300 communicate with each other by using the technology.

Actually, in different scenarios in which data is transmitted through a multipath connection, different requirements are often posed on transmission performance, such as a low latency, a high throughput, or high reliability (that is, a low packet loss rate). For example, in a scenario in which a mobile phone supporting a Wi-Fi network and an LTE network downloads a file from a network hard disk by using a multipath connection, or transfers a large file between clouds by using a multipath connection, a higher throughput is usually expected for the connection. However, in a scenario in which real-time data transmission (such as voice communication or a conference call) is performed by using a multipath connection, a low latency is expected for the connection. In addition, in a scenario in which a mobile phone uses a multipath connection to watch a video through a video site, especially a live video site, or to play a game, a lower latency and a higher throughput are usually expected for the connection.

For another example, in the system 2 in FIG. 2A, data transmission may be performed between the mobile phone 100 and the application server 200 through a Wi-Fi network or an LTE network. Usually, the Wi-Fi network is free of charge, but the LTE network is charged. Especially in a mobile roaming scenario, costs of the LTE network are very high. To reduce the costs, the mobile phone 100 needs to use the LTE network as little as possible. Therefore, the mobile phone 100 limits a transmission rate on the LTE network. In addition, the application server 200 further needs to learn of a corresponding data transmission requirement of the mobile phone 100, to transmit data to the mobile phone 100 based on the specific data transmission requirement. Therefore, the mobile phone 100 needs to notify the application server 200 of a corresponding transmission policy, so that the application server 200 can perform multipath data transmission with the mobile phone 100 according to the transmission policy.

Figure 2B:
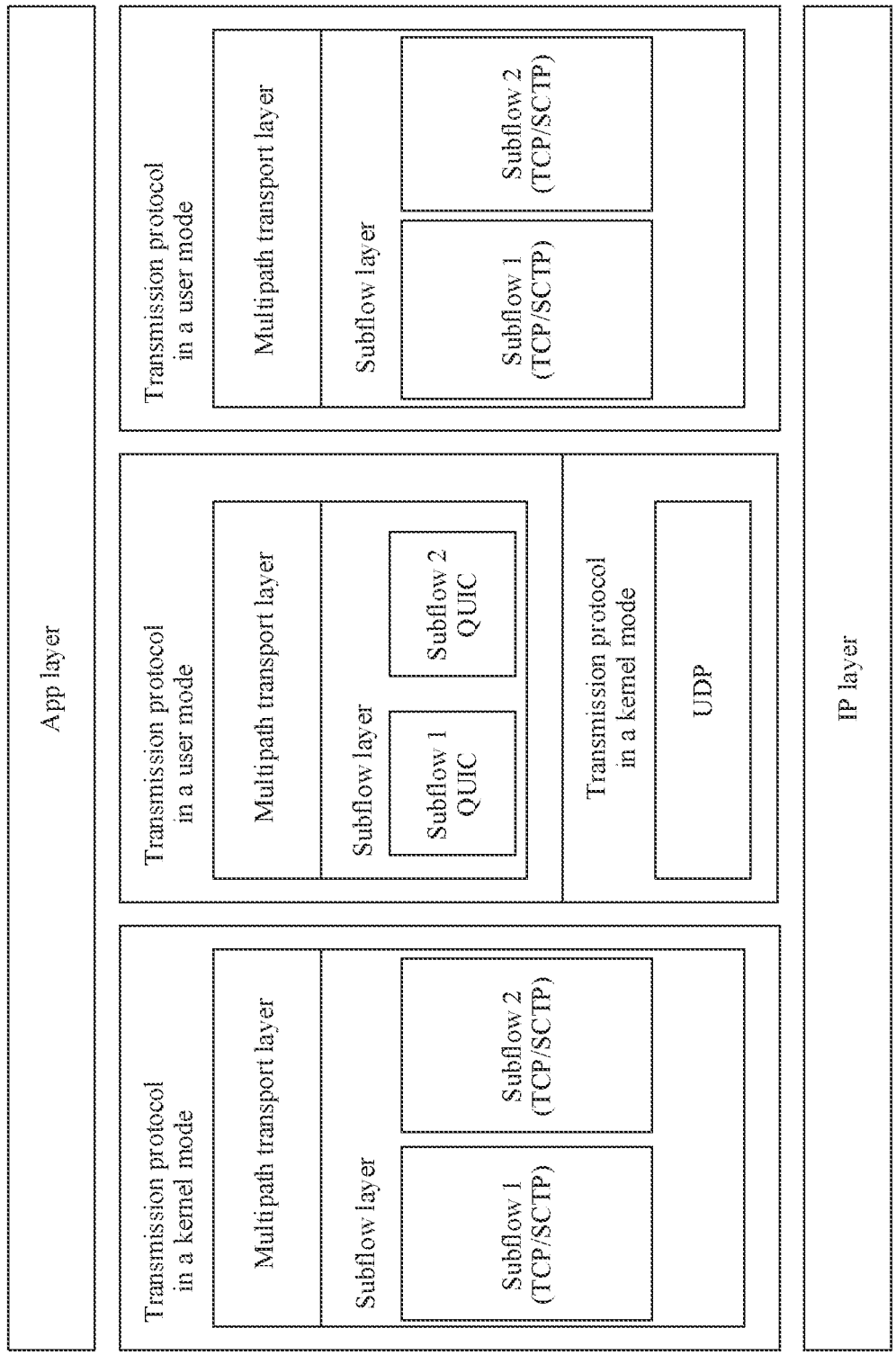
FIG. 2B is a schematic architectural diagram of three possible multipath transport layers and subflow layers according to an embodiment of this application.

FIG. 2B briefly describes some commonly used architectures of various devices in this application in terms of a software architecture. The architecture includes an application (APP) layer, a multipath transport layer, and an IP layer. It may be considered that a currently relatively common TCP layer is replaced with the multipath transport layer, and the multipath transport layer is located between the IP layer and the APP layer at which applications are run. A part of the multipath transport layer runs in a user mode of an operating system, and another part runs in a kernel mode of the operating system. Because a subflow may use a plurality of transmission protocols, such as TCP, SCTP, and QUIC, the technical solution of this application is implemented in software of a device, and may be, for example, at a kernel-mode multipath transport layer or a user-mode multipath transport layer. Further, in some technical solutions of this application, a module configured to implement a redundant transmission mode and a module configured to implement a multipath transmission mode that is at the multipath transport layer are used; and when code used to implement the method of this application is run, it may be considered that a new module is added to the multipath transport layer. The new module may be configured to measure a path feature of an optimal path of a plurality of subflows in a redundant mode, to determine a proper transmission mode or transmission path to ensure transmission performance of a multipath transmission connection. FIG. 2A shows three implementations of a multipath transport layer. The solution of this application may be implemented at the multipath transport layer in the three implementations. Each implementation includes a multipath transport layer and a subflow layer in one connection. The multipath transport layer runs a multipath transmission protocol, and two subflows are shown at the subflow layer. The foregoing device may include any one of the three multipath transport layers. In addition, the application layer is similar to the IP layer in the three implementations. Therefore, details are not described again. A multipath transport layer in a kernel mode is shown on the left side, and a subflow of the multipath transport layer uses the TCP/SCTP protocol. An MP layer in a user mode is shown in the middle, a subflow of the MP layer uses the QUIC protocol, and the UDP protocol is used for a kernel mode. A multipath transport layer in a user mode is shown on the right side, and a subflow of the multipath transport layer uses the TCP/SCTP protocol.

Figure 2C:
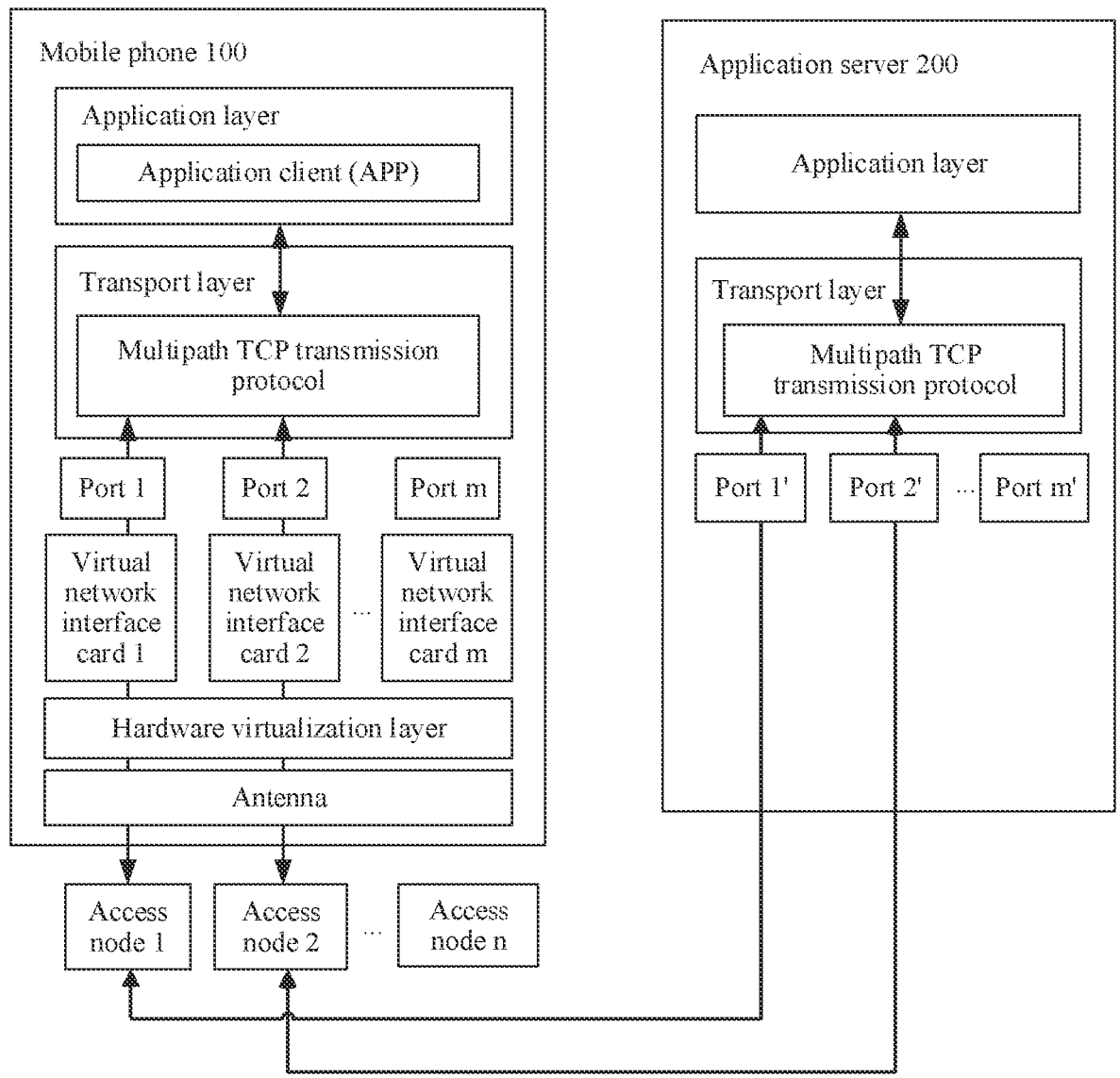
FIG. 2C is a schematic diagram of communication between a mobile phone and an application server performed by using an MPTCP technology according to this application.

FIG. 2C is a schematic diagram of using an MPTCP technology for communication between a mobile phone 100 and an application server 200 according to this application. A multipath transmission connection is established between a client of an application layer of the mobile phone 100 and an application layer of the application server 200. A path 1 may be: the application layer of the mobile phone 100->a port 1->an access node 1->a port 1' of the application server 200->the application layer of the application server 200. A path 2 may be: the application layer of the mobile phone 100->a port 2->an access node 2->a port 2' of the application server 200->the application layer of the application server 200. A multipath transmission protocol is completely compatible with the TCP protocol, and all management information of the multipath transmission connection is transmitted by using a TCP option field. Therefore, provided that both data interaction devices support the multipath transmission protocol, MP_CAP (Multipath Capable) options are exchanged during an initial connection.

A transport layer in FIG. 2C is used to run a transmission protocol and maintain a connection established with a server on a network side, where the multipath transmission protocol runs. The application layer in FIG. 2C is used to control and coordinate a structure or a module at another layer to complete a task and implement a function, including application software and an application client installed on the mobile phone 100, such as a contact list, a clock, a YouTube client, or a WeChat client.

Figure 3:
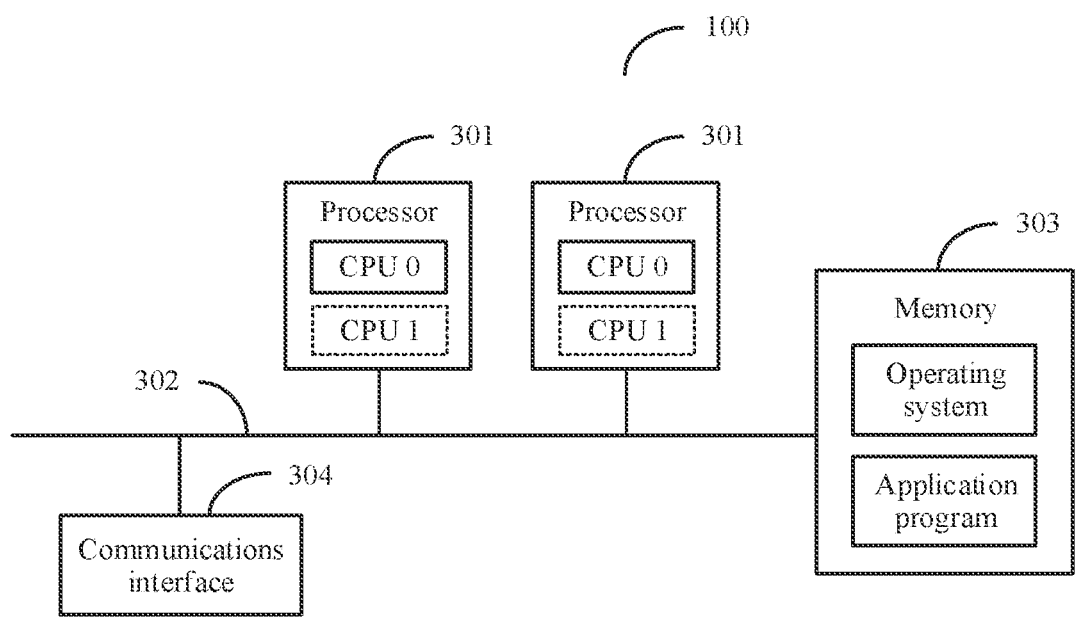
FIG. 3 is a schematic diagram of a hardware structure of a mobile phone according to an embodiment of this application.

FIG. 3 is a schematic diagram of a hardware structure of a mobile phone 100 according to an embodiment of this application. The mobile phone 100 includes a processor 301, a communications line 302, a memory 303, and at least one communications interface (FIG. 3 is described merely by using an example in which a communications interface 304 is included).

The processor 301 may be a general-purpose central processing unit (CPU), a microprocessor, a processing circuit (for example, an application-specific integrated circuit (ASIC)), or one or more integrated circuits configured to control program execution in the solution of this application. The processor 301 may include one or more CPUs, for example, a CPU 0 and a CPU 1 in FIG. 3.

The communications line 302 may include a path for transmitting information between the foregoing components.

The communications interface 304 is configured to communicate, by using any apparatus such as a transceiver, with another device or a communications network such as Ethernet, a radio access network (RAN), or a wireless local area network (WLAN).

The memory 303 may be a read-only memory (ROM) or another type of static storage device capable of storing static information and an instruction, a random access memory (RAM) or another type of dynamic storage device capable of storing information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a storage medium (for example, a magnetic disk storage medium) or another magnetic storage device, or any other medium that is capable of carrying or storing expected program code in a form of an instruction or a data structure and that can be accessed by a computer. However, this is not limited thereto. The memory may exist independently and is connected to the processor by using the communications line 302. The memory may alternatively be integrated with the processor.

The memory 303 is configured to store a computer-executable instruction for executing the solution of this application. The memory 303 may store an operating system and an application program that are used to implement the method in the embodiments of this application, and the processor 301 controls the execution. The processor 301 is configured to execute the computer-executable instruction stored in the memory 303, to implement the data transmission method provided in the following embodiment of this application. The memory 303 shown in FIG. 3 is merely a schematic diagram. The memory may further include another functional instruction. This is not limited in the present invention.

Figure 4:
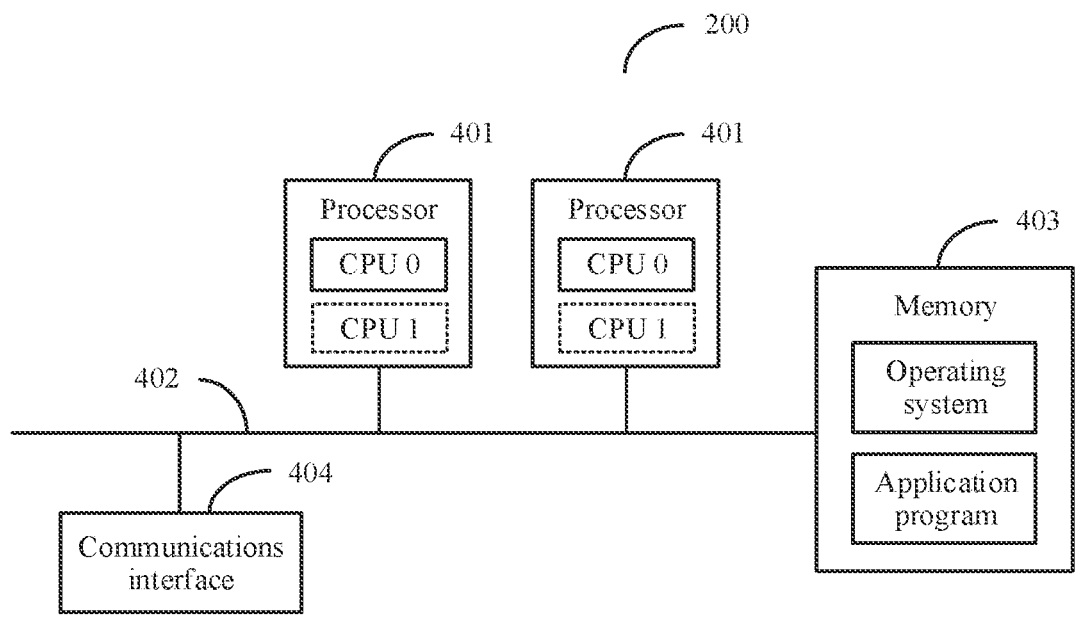
FIG. 4 is a schematic diagram of a hardware structure of an application server according to an embodiment of this application.

The application server 200 in this embodiment of this application may have a hardware structure similar to that of the mobile phone 100. FIG. 4 is a schematic diagram of a hardware structure of an application server 200 according to an embodiment of this application. A memory 403 may store an operating system and an application program that are used to implement the method in the embodiments of this application, and a processor 401 controls the execution. For descriptions of the processor 401, a communications line 402, the memory 403, and a communications interface 404, refer to the foregoing descriptions of the processor 301, the communications line 302, the memory 303, and the communications interface 304.

The data transmission method provided in the embodiments of this application is described below with reference to FIG. 1A to FIG. 4. A basic principle of the method is as follows: A multipath transmission protocol is extended, so that a transmit end and a receive end that transmit data by using a multipath transmission technology can negotiate a transmission policy in a link establishment phase and a transmission process, and the transmit end and the receive end can flexibly adjust the transmission policy through negotiation dynamically based on actual situations of the transmit end and the receive end and another factor, including a path management policy and/or a data scheduling policy, to improve user experience.

Figure 5:
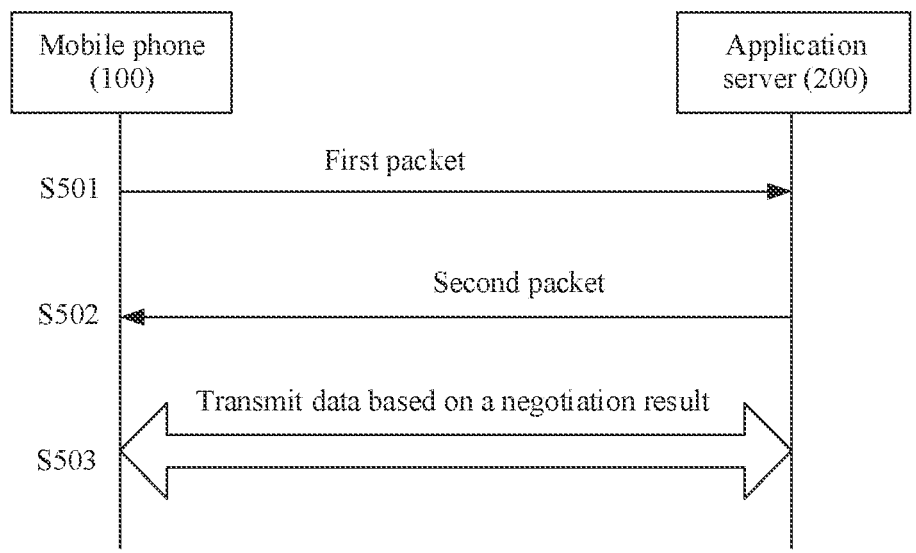
FIG. 5 is a first interaction diagram of a data transmission method according to an embodiment of this application.

FIG. 5 is a first interaction diagram of a data transmission method according to an embodiment of this application. The method may be used for a multipath connection between a mobile phone 100 and an application server 200. The method may include the following steps.

S501. The mobile phone 100 sends a first packet to the application server 200.

The first packet may include transmission policy negotiation information. The transmission policy negotiation information is used to negotiate, with the application server 200, a transmission policy used when the application server 200 transmits data to the mobile phone 100 by using the multipath connection.

In a possible implementation, the transmission policy negotiated by the mobile phone 100 and the application server 200 in this embodiment of this application may be at least one of a path management policy and a data scheduling policy, or may be both a path management policy and a data scheduling policy, or may be only a data scheduling policy, or may be only a path management policy.

The path management policy indicates a policy for establishing a multipath connection between at least two network addresses of the mobile phone 100 and at least two network addresses of the application server 200. For example, in a "default" path management policy, a new network address is not broadcast, but a link establishment request sent by a new network address of a transmission peer end may be passively accepted. For another example, in a "full-mesh" path management policy, all paths that may be established between a receive end and a transmit end are established. As shown in FIG. B, four paths may be established between the mobile phone 100 and the application server 200. Therefore, all the four paths are established according to the "full-mesh" policy.

The data scheduling policy indicates a data allocation policy used when the mobile phone 100 transmits data by using the multipath connection, for example, a minimum latency first policy, a random allocation policy, and a redundant transmission policy.

The minimum latency first policy is performing data transmission with a minimum latency. The random allocation policy is randomly establishing a path. For example, when a random number is 1, a path A and a path B are established for data transmission, and when a random number is 2, a path C and a path D are established for data transmission. Paths corresponding to different random numbers may be customized. The redundant transmission policy is transmitting same data on all paths of a multipath transmission connection, in other words, data of one connection is repeatedly transmitted on a plurality of paths.

In a possible implementation, the transmission policy negotiation information may include at least one of second policy information, third policy information, and fourth policy information.

The second policy information indicates a transmission policy used when the mobile phone 100 transmits data by using the multipath connection. In a possible implementation, the transmission policy used when the mobile phone 100 transmits data by using the multipath connection may be understood as a transmission policy currently used by the mobile phone 100. For example, the mobile phone 100 currently uses a redundant transmission mode. "Current" is a moment at which the mobile phone 100 sends the first packet to the application server 200.

The third policy information indicates a transmission policy that is recommended by the mobile phone 100 for the application server 200 to transmit data by using the multipath connection. In a possible implementation, the transmission policy that is recommended by the mobile phone 100 for the application server 200 to transmit data by using the multipath connection may be the transmission policy indicated by the second policy information, namely, the transmission policy currently used by the mobile phone 100, or may be any transmission policy supported by the mobile phone 100.

In a possible implementation, the transmission policy that is recommended by the mobile phone 100 for the application server 200 to transmit data by using the multipath connection may be a transmission policy that is determined by the mobile phone 100 based on a data transmission requirement (for example, a data transmission requirement of an application client installed in the mobile phone 100) obtained by the mobile phone and that can meet the data transmission requirement. A specific process is described in detail below.

The fourth policy information indicates at least one transmission policy that can be used by the mobile phone 100. "Can be used" may be understood as "supported", that is, the fourth policy information indicates at least one transmission policy supported by the mobile phone 100. For example, the mobile phone 100 can support minimum latency first/random allocation/redundant sending.

Similarly, the transmission policies indicated by the second transmission policy, the third policy information, and the fourth policy information may also include a path management policy and/or a data scheduling policy.

S502. The mobile phone 100 receives a second packet from the application server 200.

The second packet may include first policy information. The first policy information indicates a transmission policy used when the application server 200 uses the multipath connection.

In a possible implementation, the first policy information is determined by the application server 200 according to a path management policy and/or a data scheduling policy included in the first packet that is sent by the mobile phone 100 and based on a path management policy and/or a data scheduling policy that can be used (namely, can be supported) by the application server 200.

Specifically, if the path management policy and/or the data scheduling policy supported by the application server 200 may match a requirement of the mobile phone 100, the requirement may be a path management policy and/or a data scheduling policy indicated by the second policy information, a path management policy and/or a data scheduling policy indicated by the third policy information, or a path management policy and/or a data scheduling policy indicated by the fourth policy information.

In a possible implementation, the transmission policy indicated by the first policy information is a transmission policy corresponding to the transmission policy negotiation information sent by the mobile phone 100.

"Corresponding" may be understood as matching. For example, "a transmission policy corresponding to the transmission policy negotiation information" may be a transmission policy indicated by the transmission policy negotiation information. The transmission policy may be alternatively a transmission policy that is often used together with the transmission policy indicated by the transmission policy negotiation information (for example, the transmission policy can meet expected transmission performance when used together in a specific scenario). The transmission policy may be alternatively a transmission policy that complies with a specified matching rule and matches the transmission policy indicated by the transmission policy negotiation information (for example, a preset matching relationship: if the transmission policy negotiation information indicates a transmission policy B, the second device uses a transmission policy C, where the transmission policy C may be the same as or different from the transmission policy B).

"Matching" may also be understood as close transmission performance.

"Close performance" may be understood as that performance attributes indicated by path manager policies or data scheduler policies are the same. The performance attribute indicates whether the policy is a high throughput policy, a low latency policy, a redundancy policy, or the like. Alternatively, "close performance" may be understood as that attribute quantization reference values indicated by path manager policies or data scheduler policies are approximate. The attribute quantization reference value is a quantized value corresponding to a path management policy or a data scheduling policy of each attribute.

In a possible implementation, the transmission policy indicated by the first policy information is any one of the following: the transmission policy indicated by the second policy information, the transmission policy indicated by the third policy information, or the transmission policy indicated by the fourth policy information.

In a possible implementation, the application server 200 may first determine whether the path management policy and/or the data scheduling policy supported by the application server 200 can match the path management policy and/or the data scheduling policy indicated by the third policy information. In other words, the application server 200 determines whether the application server 200 supports a path management policy and/or a data scheduling policy that are/is recommended by the mobile phone 100 for the application server 200 to transmit data by using the multipath connection.

If the matching succeeds, the application server 200 determines that the first policy information indicates the corresponding path management policy and/or the corresponding data scheduling policy indicated by the third policy information. If the matching fails, the application server 200 may determine whether the path management policy and/or the data scheduling policy supported by the application server 200 can match the path management policy and/or the data scheduling policy indicated by the second policy information, namely, the transmission policy currently used by the mobile phone 100. If the matching succeeds, the application server 200 determines that the first policy information indicates the corresponding path management policy and/or the corresponding data scheduling policy indicated by the second policy information. If the matching fails, the application server 200 determines that the first policy information indicates a path management policy and/or a data scheduling policy that are/is supported by the application server 200 and whose performance is close to that of the path management policy and/or the data scheduling policy indicated by the second policy information or the third policy information, or the application server 200 determines that the first policy information indicates a corresponding path management policy and/or a corresponding data scheduling policy supported by the application server 200 and the mobile phone 100.

For example, the third policy information indicates a data scheduling policy 1, and the data scheduling policy 1 is a high throughput policy. The application server 200 does not support the data scheduling policy 1, but supports a data scheduling policy 2, and the policy is also a high throughput policy. Therefore, the application server 200 may perform data transmission with the mobile phone 100 by using the data scheduling policy 2.

For another example, Table 1 is a performance attribute table of a data scheduling policy that can be supported by the mobile phone 100 according to an embodiment of this application. Content of Table 1 may be indicated by the fourth policy information included in the first packet that is sent by the mobile phone 100 to the application server 200. As shown in Table 1, data scheduler policies that can be used by the mobile phone 100 include a scheduler policy 1, a scheduler policy 2, and a scheduler policy 3. Each of the scheduler policy 1 and the scheduler policy 2 is a data scheduler policy whose attribute is a high throughput, and attribute quantization reference values of the scheduler policy 1 and the scheduler policy 2 are an aggregation rate value 1 (for example, 1 Tbps) and an aggregation rate value 2 (for example, 1.2 Tbps). The scheduler policy 3 is a data scheduling policy whose attribute is a low latency, and an attribute quantization reference value of the scheduler policy 3 is a low latency value (for example, 1 μs).

TABLE 1

| Data scheduling policy | Attribute | Attribute quantization reference value |
| --- | --- | --- |
| Scheduler policy 1 | High throughput | Aggregation rate value 1 Tbps |
| Scheduler policy 2 | High throughput | Aggregation rate value 1.2 Tbps |
| Scheduler policy 3 | Low latency | Low latency value 1 μs |

It should be noted that, for determining, by the application server 200 according to the path management policy included in the first packet that is sent by the mobile phone 100 and based on a path management policy that can be supported by the application server 200, the path management policy indicated by the first policy information, refer to the foregoing process and method for determining the data scheduling policy indicated by the first policy information.

In a possible implementation, after determining the first policy information, the application server 200 may not send the second packet to the mobile phone 100, but directly transmit data to the mobile phone 100 by using the transmission policy indicated by the first policy information.

For example, the first packet sent by the mobile phone 100 includes a transmission policy recommended by the mobile phone 100 for the application server 200. The application server 200 determines, based on the information, that the application server 200 can use the transmission policy recommended by the mobile phone 100 for the application server 200. The application server 200 may not send the first policy information to the mobile phone 100, but directly transmits data to the mobile phone 100 by using the determined transmission policy.

S503. The mobile phone 100 and the application server 200 transmit data based on a negotiation result.

The mobile phone 100 transmits data to the application server 200 based on the first policy information by using a transmission policy corresponding to the first policy information. The application server 200 transmits data to the mobile phone 100 by using the transmission policy indicated by the first policy information.

"A transmission policy corresponding to the first policy information" may be understood as a transmission policy that is the same as the transmission policy indicated by the first policy information, or a transmission policy whose attribute is the same as that of the transmission policy indicated by the first policy information, or a transmission policy whose attribute quantization reference value is approximate to that of the transmission policy indicated by the first policy information. As described above, the application server 200 determines the first policy information based on the transmission policy negotiation information in the first packet. Specifically, the transmission policy indicated by the first policy information may be the same as the transmission policy in the transmission policy negotiation information, or may have a same attribute or an approximate quantization reference value as the transmission policy in the transmission policy negotiation information. Therefore, after the negotiation is completed, transmission policies separately used by the mobile phone 100 and the application server 200 are definitely "corresponding".

A type of the transmission policy indicated by the first policy information is the same as a type of the transmission policy indicated by the transmission policy negotiation information, and the type of the transmission policy is at least one of a path management policy and a data scheduling policy.

For example, the transmission policy indicated by the transmission policy negotiation information includes a path management policy and a data scheduling policy, that is, the transmission policy negotiation information is used to negotiate the path management policy and the data scheduling policy. In this case, the first policy information returned by the application server 200 to the mobile phone 100 is a feedback for the transmission policy negotiation information, that is, a result of negotiating the path management policy and the data scheduling policy is fed back.

In a possible implementation, a protocol stack of the mobile phone 100 may determine the transmission policy negotiation information based on a data transmission requirement corresponding to the multipath connection.

In a possible implementation, the multipath connection is a multipath transmission control protocol MPTCP connection or a multipath quick user data packet transmission protocol MPQUIC connection.

Figure 6:
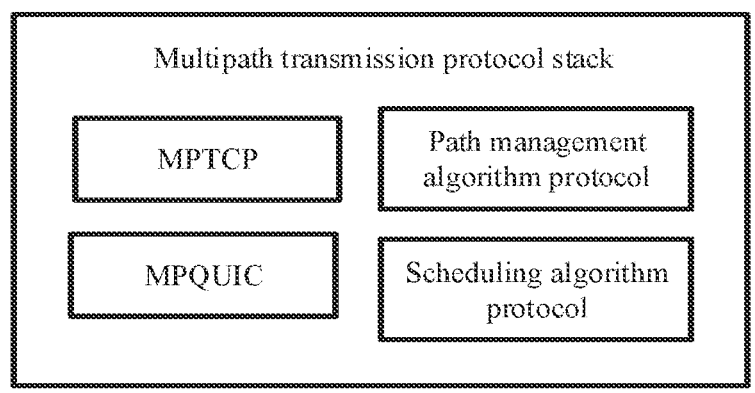
FIG. 6 is a schematic structural diagram of a multipath transmission protocol stack according to an embodiment of this application.

FIG. 6 is a schematic structural diagram of a multipath transmission protocol stack according to an embodiment of this application. The mobile phone 100 and the application server 200 may be implemented by using an open-source kernel of an operating system of a Linux open-source computer in the MPTCP protocol and the MPQUIC protocol.

Figure 7:
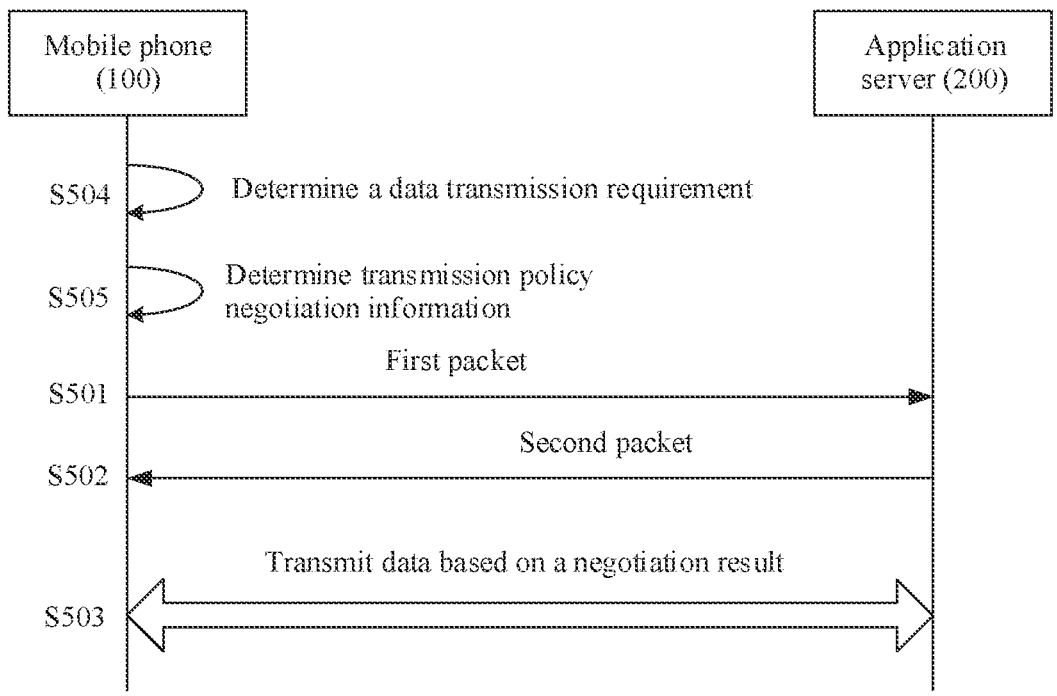
FIG. 7 is a second interaction diagram of a data transmission method according to an embodiment of this application.

In a possible implementation, as shown in FIG. 7, before S501, the method may further include the following step:

S504. The mobile phone 100 determines a data transmission requirement.

The data transmission requirement may be a data transmission requirement of an application client installed in the mobile phone 100. For example, a WeChat client (which is a multi-purpose messaging, social media and mobile payment app developed by Tencent) requires a low latency for data transmission with the application server. For another example, an iQiyi client (which is an online video platform) requires a high throughput for data transmission with the application server.

S505. The mobile phone 100 determines the transmission policy negotiation information based on the data transmission requirement.

For example, if the WeChat client requires a low latency for data transmission with the application server, the protocol stack of the mobile phone 100 determines, based on the requirement, that the data scheduling policy included in the transmission policy negotiation information is a policy whose attribute is a low latency. For another example, if the iQiyi client requires a high throughput for data transmission with the application server, the protocol stack of the mobile phone 100 determines, based on the requirement, that the scheduler policy included in the transmission policy negotiation information is a policy whose attribute is a high throughput.

It should be noted that the method shown in FIG. 7 may be performed in a phase 1 and a phase 2 in which the mobile phone 100 and the application server 200 use the multipath connection.

Figure 8A:
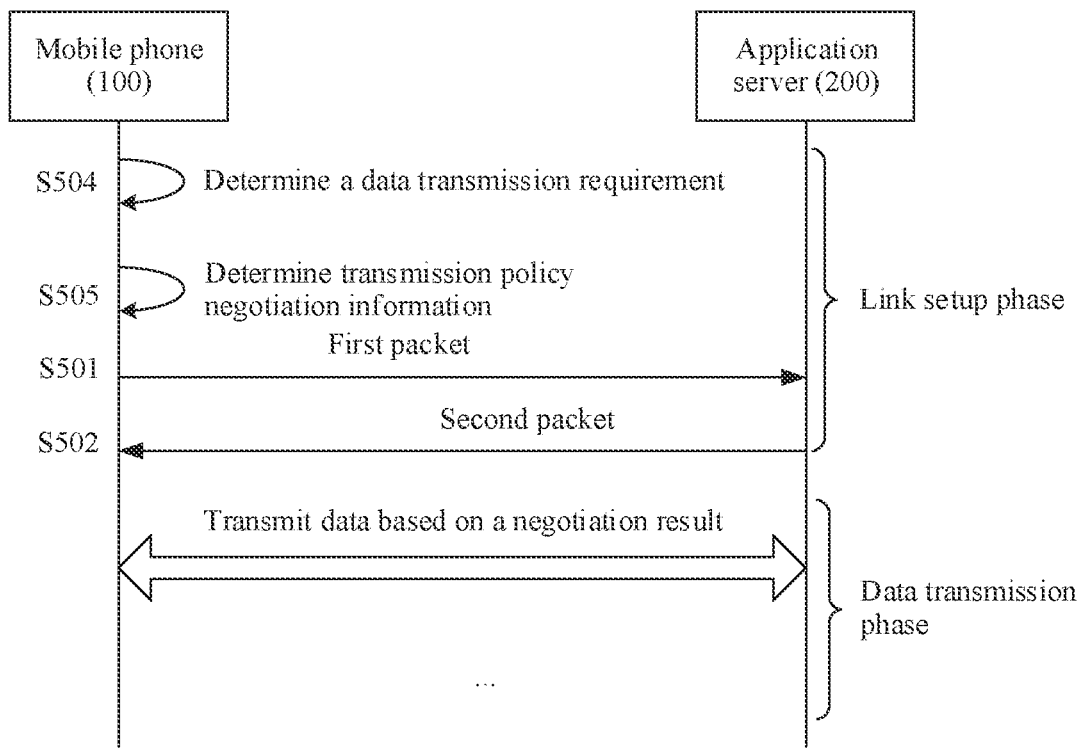
FIG. 8A is a third interaction diagram of a data transmission method according to an embodiment of this application.
Figure 8B:
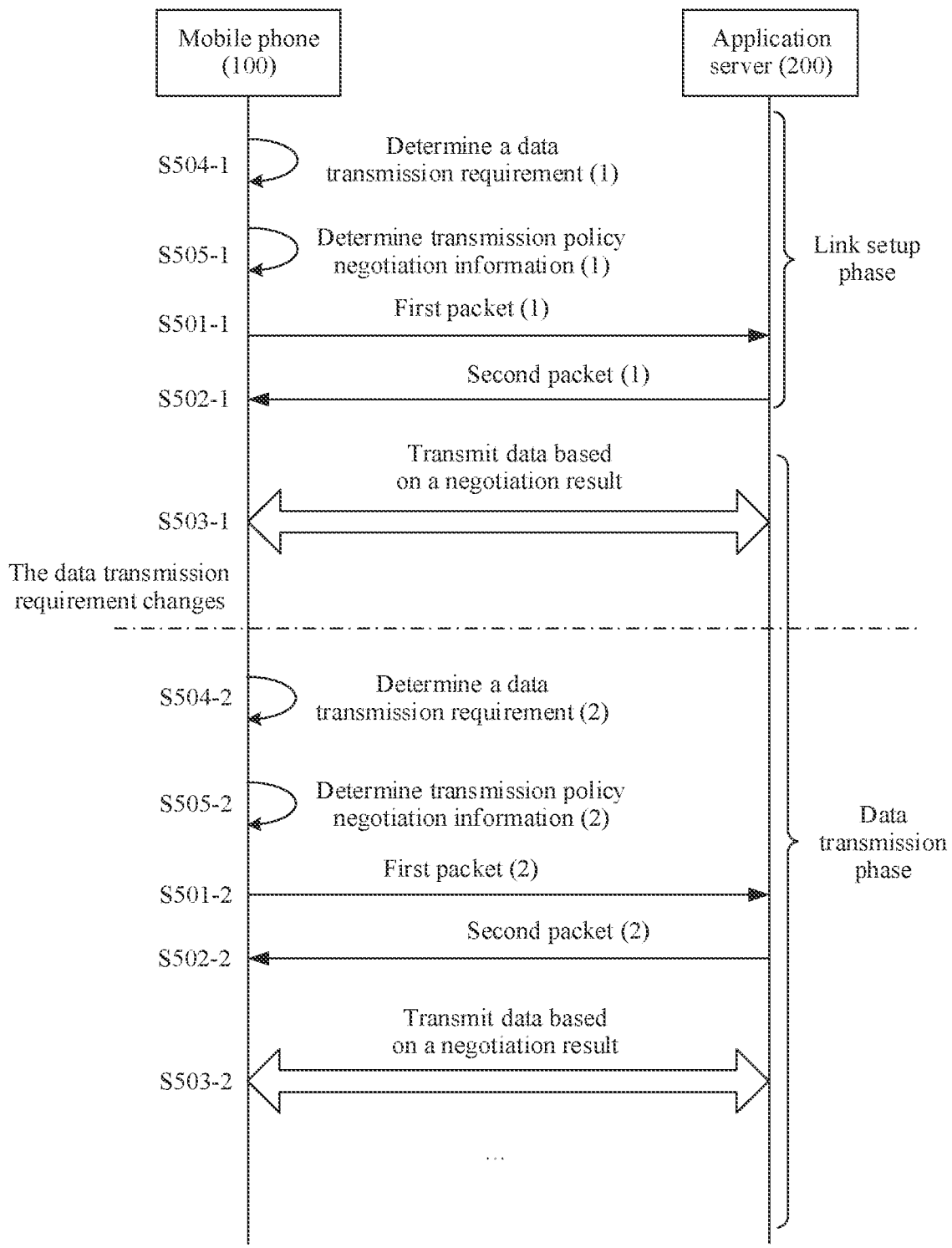
FIG. 8B is a fourth interaction diagram of a data transmission method according to an embodiment of this application.

Phase 1 is a phase of establishing a link by the mobile phone 100 and the application server 200 shown in FIG. 8A and FIG. 8B. In this phase, the mobile phone 100 sends the first packet to the application server 200. The link establishment phase is a phase in which the mobile phone 100 establishes a multipath transmission connection to the application server 200.

The first packet may be a handshake packet. The handshake packet is a handshake packet used by the mobile phone 100 and the application server 200 to establish a primary subflow, or the handshake packet is a handshake packet used by the mobile phone 100 and the application server 200 to establish a subflow other than the primary subflow. In this possible implementation, the first packet may be implemented in the following three implementations:

Implementation (A): The first packet is a handshake packet in an MP_CAPABLE phase.

Figure 9A:
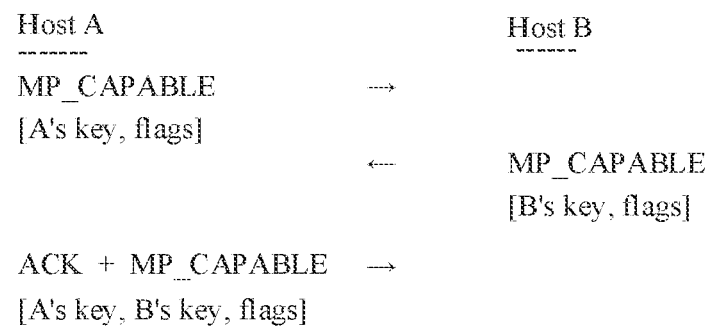
FIG. 9A is an example 1 of an exchange procedure of a first packet according to an embodiment of this application.

Because a procedure of establishing the multipath transmission connection is similar to that of establishing a TCP connection and is a three-way handshake, a packet of the three-way handshake carries multipath capability exchange (Multipath_Capable, MP_CAPABLE), and two parties perform exchange to indicate that devices at a transmit end and a receive end support a multipath transmission protocol. FIG. 9A is an example 1 of an exchange procedure of a first packet according to an embodiment of this application. The mobile phone 100 and the application server 200 may establish the primary subflow in the MP_CAPABLE phase, and the first packet is a handshake packet in the MP_CAPABLE phase.

Implementation (B): The first packet is a handshake packet in an MP_JOIN phase.

Figure 10A:
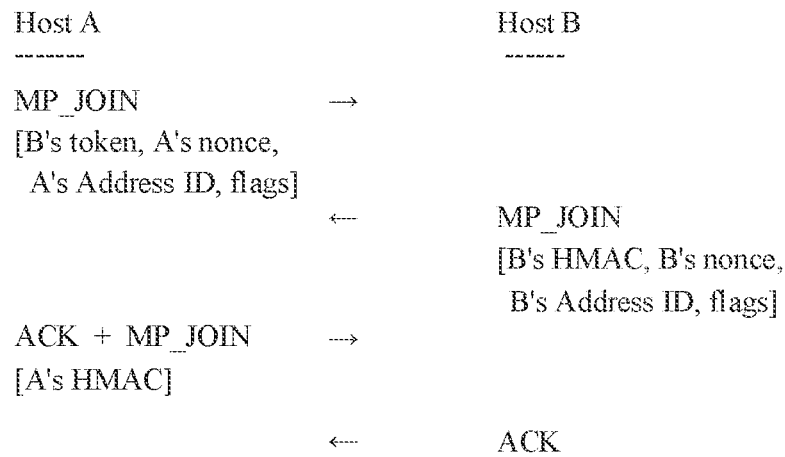
FIG. 10A is an example 2 of an exchange procedure of a first packet according to an embodiment of this application.

After the primary subflow is established in the MP_CAPABLE phase, the mobile phone 100 adds a subflow to an MPTCP connection. This phase is a multipath subflow join (Multipath_Join, MP_JOIN) phase. FIG. 10A is an example 2 of an exchange procedure of a first packet according to an embodiment of this application. The mobile phone 100 and the application server 200 may establish another subflow in the MP_JOIN phase, and the first packet is a handshake packet in the MP_JOIN phase.

Implementation (C): The first packet is an MPQUIC extension packet.

Similarly, the second packet may also be a handshake packet. Specifically, the second packet may also be a handshake packet in the MP_CAPABLE phase or a handshake packet in the MP_JOIN phase. Alternatively, the second packet may also be an MPQUIC extension packet.

Figure 8C:
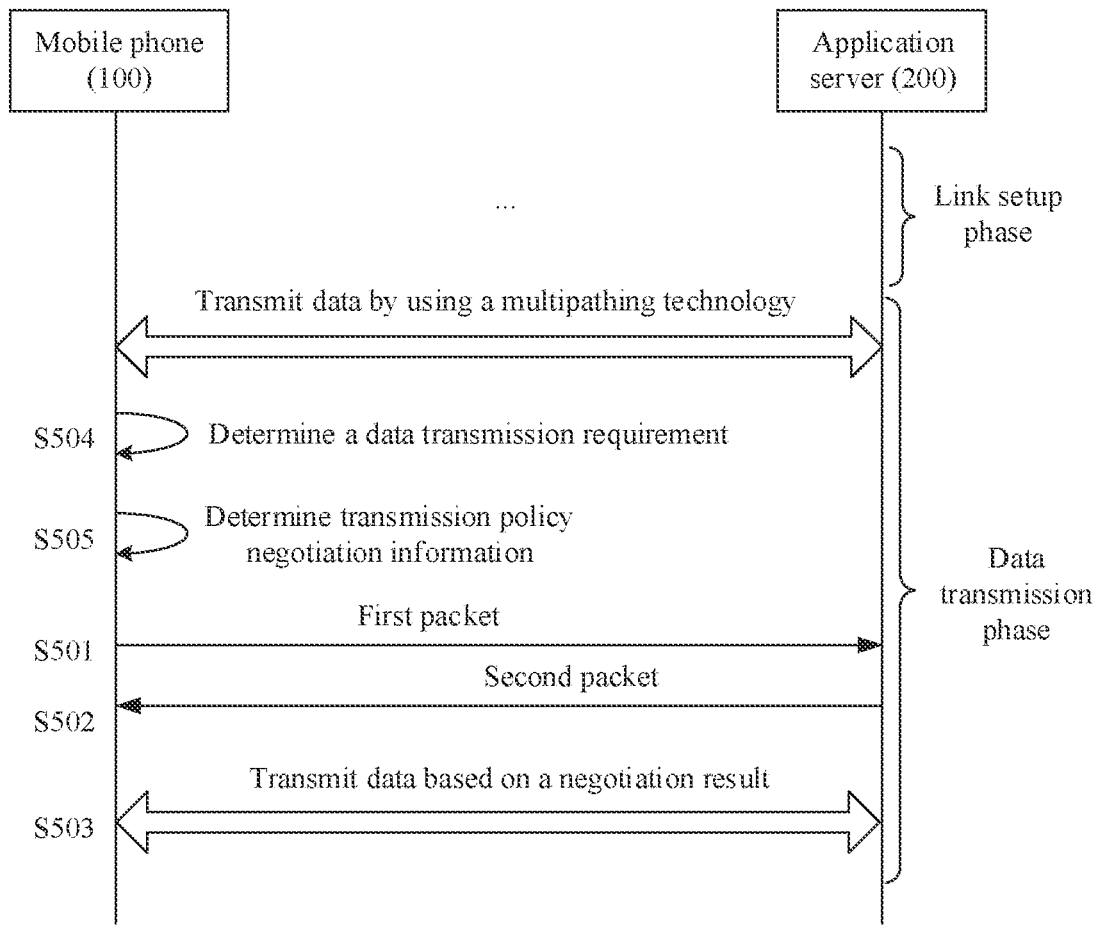
FIG. 8C is a fifth interaction diagram of a data transmission method according to an embodiment of this application.

Phase 2 is a phase in which the mobile phone 100 and the application server 200 shown in FIG. 8B and FIG. 8C perform data transmission by using a multipath technology. In this possible implementation, the first packet may be implemented in the following two implementations:

Implementation (1): The first packet is an MPTCP extension packet.

Implementation (2): The first packet is an MPQUIC extension packet.

The first packet may be a data packet or a control packet in a data transmission process. Similarly, the second packet may also be a data packet or a control packet in a data transmission process. Specifically, a packet format of the first packet and/or a packet format of the second packet in the data transmission process are/is specifically described below.

In a possible implementation, S504-2 in FIG. 8B may be triggered in response to detecting that a data transmission requirement of an application changes.

For example, the mobile phone 100 has a Wi-Fi network and an LTE cellular network. The Wi-Fi network is free of charge, but the LTE cellular network is charged by traffic. A download service or a video play service is performed between the mobile phone 100 and the application server 200. Downloading using the multipath transmission protocol can increase a download speed and improve user experience. However, a user expects that data is scheduled to the free Wi-Fi network as much as possible, and a small amount of data is scheduled to the LTE network according to the multipath protocol. S504-1, S505-1, S501-1, and S502-1 are performed in the link establishment phase, and it is recommended that the application server 200 use a Wi-Fi-first data scheduling policy, and then transmit data according to the negotiated transmission policy. However, in the data transmission process, the user finds that excessive LTE traffic cannot be accepted, and expects not to send a data packet by using a path established by the LTE cellular network. Therefore, transmission policy negotiation in the data transmission phase (that is, S504-2, S505-2, S501-2, and S502-2) is initiated, and it is recommended that the application server 200 uses no-LTE scheduling. According to the recommendation, the application server 200 sends data only on a path established by the Wi-Fi network.

For another example, the mobile phone 100 has a plurality of network addresses, where a network address 1 is allocated by an operator A. and a network address 2 is allocated by an operator B. The application server 200 also has a plurality of network addresses that separately belong to the operator A and the operator B. In the link establishment phase, the mobile phone 100 needs to perform only low-latency transmission. Therefore, the mobile phone 100 performs S504-1, S505-1, S501-1, and S502-1 in the link establishment phase, and it is recommended that the application server 20 use a low-latency path management policy. Because a latency of a network link between different operators is relatively high, the application server 20 may establish, according to the recommendation, a connection from the network address 1 allocated by the operator A to a network address allocated by the operator A corresponding to the application server 200 and a connection from the network address 2 allocated by the operator B to a network address allocated by the operator B corresponding to the application server 200, to meet a low-latency transmission requirement, and then transmit data according to the negotiated transmission policy. However, in the data transmission process, the mobile phone 100 further expects to switch to a service with a relatively high throughput. Therefore, transmission policy negotiation in the data transmission phase (that is, S504-2, S505-2, S501-2, and S502-2) is initiated, and it is recommended that the application server 200 use a full-mesh path management policy. According to the recommendation, the application server 200 additionally establishes two paths between different operators, so that data can be transmitted on four paths in total.

In a possible implementation, in FIG. 8C, when a connection is initially established (namely, in the link establishment phase), if an application has no data transmission requirement, the mobile phone 100 and the application server 200 may first perform transmission by using a default transmission policy, and negotiate a transmission policy after detecting a data transmission requirement of the application.

It should be noted that when the mobile phone 100 negotiates the transmission policy with the application server 200 in the data transmission phase using the multipath technology, both transmission policy negotiation and transmission policy switching are performed in the data transmission process. In other words, in the foregoing process, the multipath connection is not disconnected, and data transmission is not interrupted. Therefore, use of the user is not affected.

In a possible implementation, the first packet may further include first indication information, and the first indication information is used to indicate that the first packet includes the transmission policy negotiation information.

In a possible implementation, the first packet may include a first extension bit. The transmission policy negotiation information is located in the first extension bit in a packet header of the first packet. The first packet may further include a second extension bit. The first indication information is located in the second extension bit of the first packet.

Figure 9B:
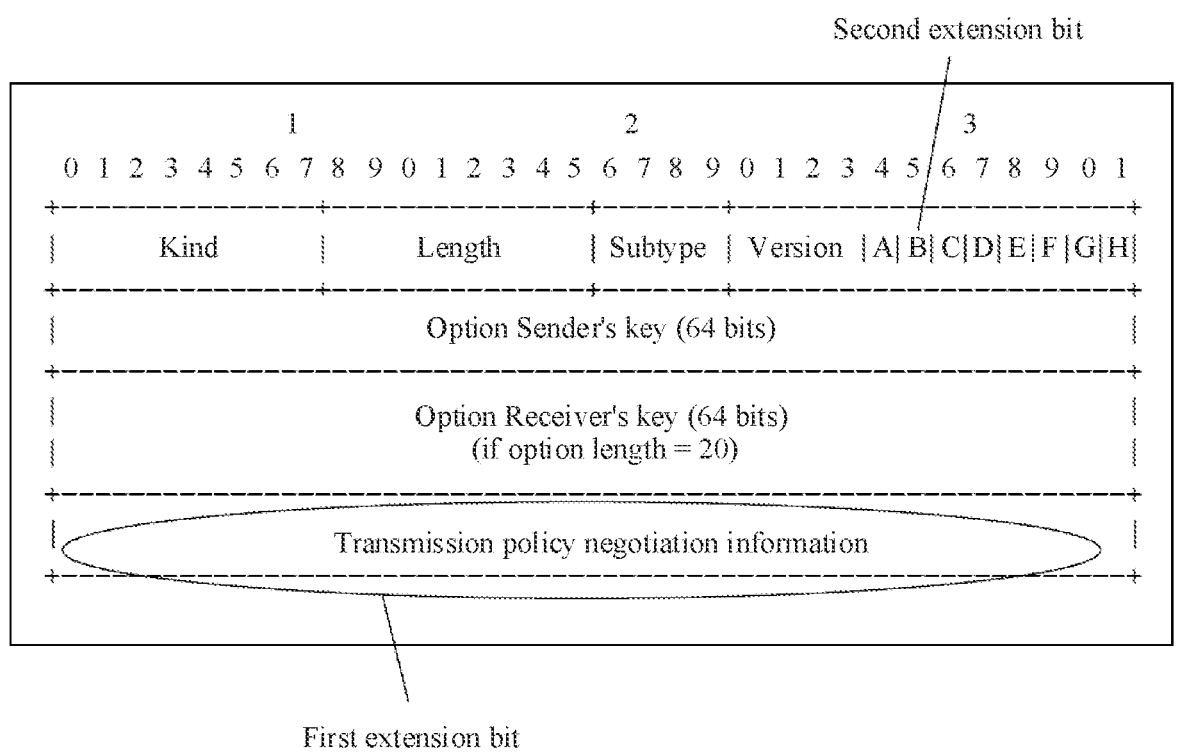
FIG. 9B is an example 1 of a format of a first packet according to an embodiment of this application.

The mobile phone 100 sends the first packet to the application server 200 in the phase 1, namely, the link establishment phase. FIG. 9B is an example 1 of a format of a first packet in an implementation (A) according to an embodiment of this application. A, B, C, D, E, F, G, and H in FIG. 9B are corresponding flag bits, and represent different semantics. The B bit is the second extension bit that is used to identify the first indication information, that is, identify whether the first packet includes the transmission policy negotiation information. Specifically, if the B bit is 1, it indicates that the first packet includes the transmission policy negotiation information. Specifically, the transmission policy negotiation information is carried in the first extension bit.

Figure 10B:
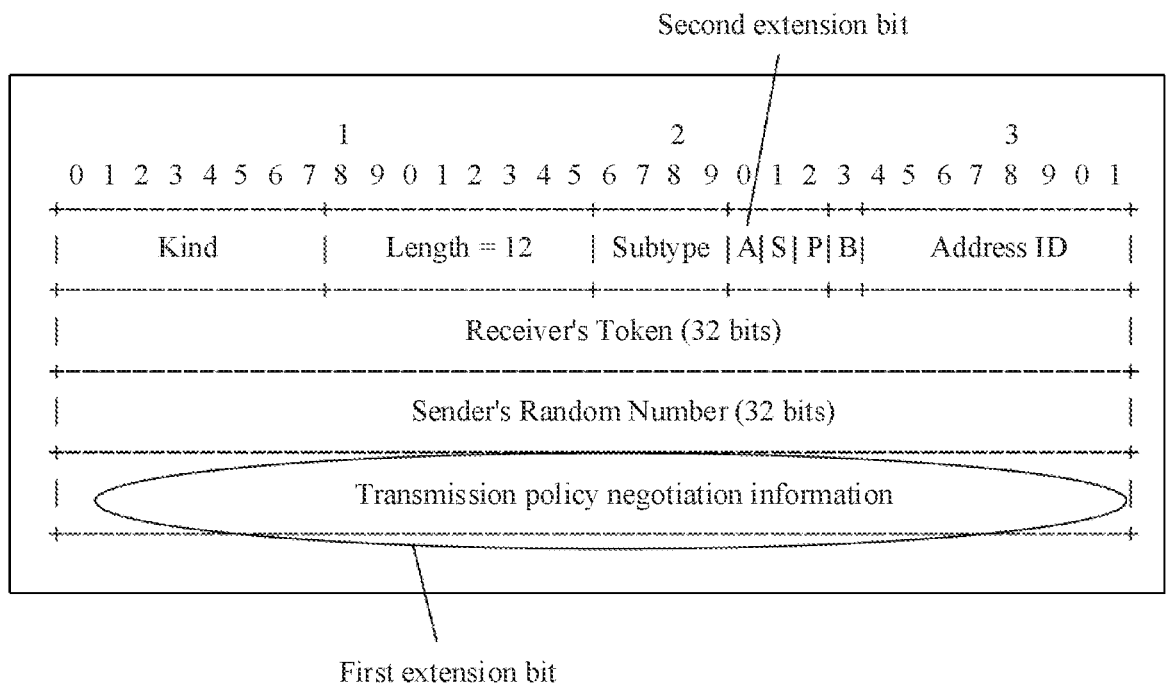
FIG. 10B is an example 3 of a format of a first packet according to an embodiment of this application.

Further, FIG. 10B is an example 3 of a format of a first packet in an implementation (B) according to an embodiment of this application. The A bit is the second extension bit that is used to identify the first indication information, that is, identify whether the first packet includes the transmission policy negotiation information. Specifically, if the A bit is 1, it indicates that the first packet includes the transmission policy negotiation information. Specifically, the transmission policy negotiation information is carried in the first extension bit.

The first indication information may be further used to indicate whether the first packet includes PM policy negotiation information or scheduler policy negotiation information. The indication information may be carried by using another extension bit.

Figure 9C:
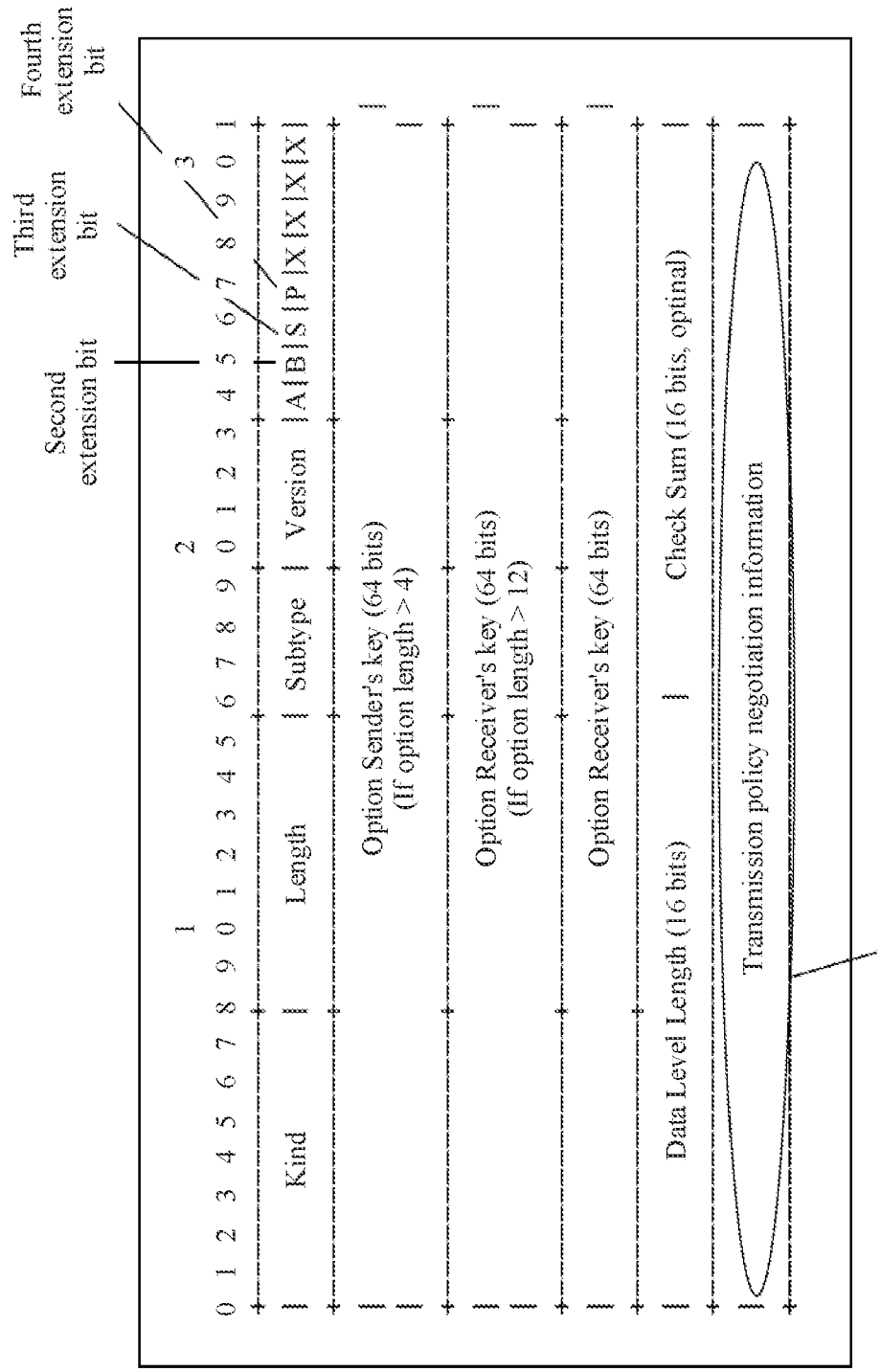
FIG. 9C is an example 2 of a format of a first packet according to an embodiment of this application.

FIG. 9C is an example 2 of a format of a first packet in an implementation (A) according to an embodiment of this application. If the B bit is 1, subsequent C and D may be respectively extended to a third extension bit S and a fourth extension bit P, indicating semantics different from those of C and D in FIG. 9B. As shown in FIG. 9C, if the S bit is 1, it indicates that the first packet includes the scheduler policy negotiation information. If the P bit is 1, it indicates that the first packet includes the PM policy negotiation information. Specifically, the transmission policy negotiation information is carried in the first extension bit.

Figures 10C, 11:
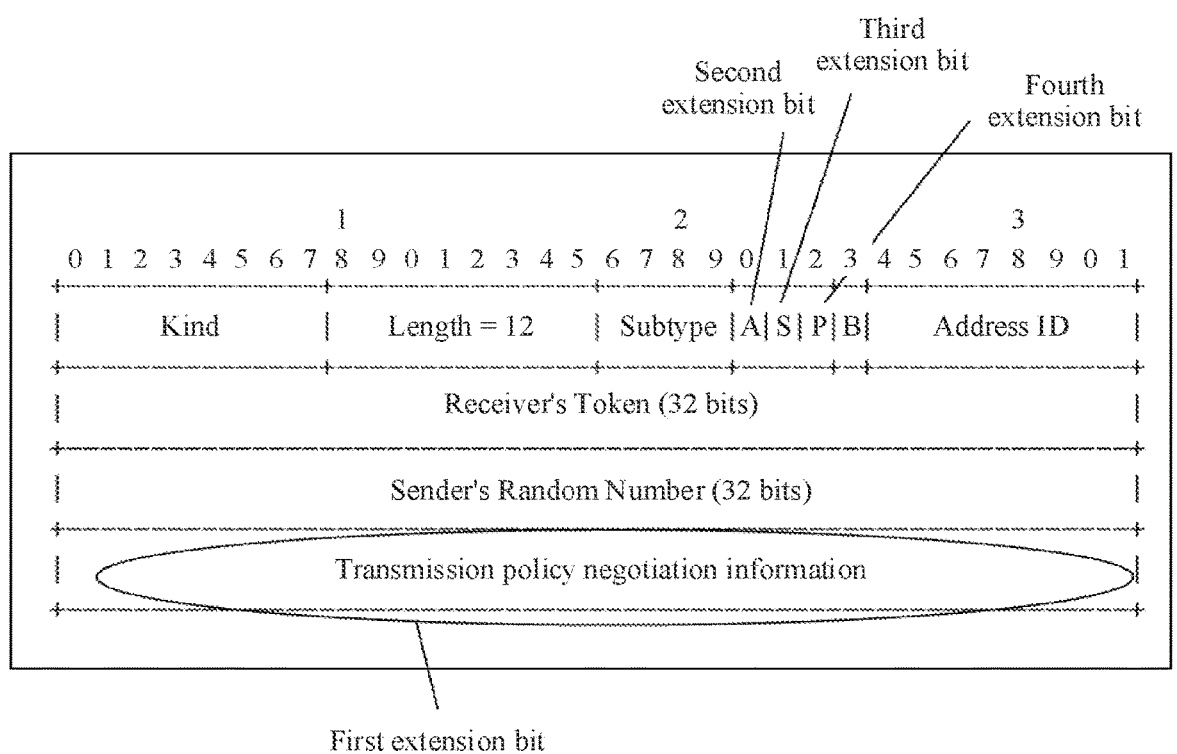
FIG. 10C is an example 4 of a format of a first packet according to an embodiment of this application.
FIG. 11 is an example 5 of a format of a first packet according to an embodiment of this application.

Further, FIG. 10C is an example 4 of a format of a first packet in an implementation (B) according to an embodiment of this application. If the A bit is 1, subsequent S and P may be respectively extended to a third extension bit and a fourth extension bit. If the S bit is 1, it indicates that the first packet includes the scheduler policy negotiation information. If the P bit is 1, it indicates that the first packet includes the PM policy negotiation information. Specifically, the transmission policy negotiation information is carried in the first extension bit.

It should be noted that FIG. 9B, FIG. 9C, FIG. 10B, and FIG. 10C are merely used as examples to describe the extension bit that carries the first indication information and the extension bit that carries the transmission policy negotiation information, and a specific location of each extension bit is not limited. Specifically, the location of each extension bit may not be limited to locations in FIG. 9B and FIG. 9C.

Similarly, the second packet may include second indication information, and the second indication information is used to indicate that the second packet includes the first policy information. The second packet may also include a first extension bit and a second extension bit, where the first policy information is located in the first extension bit of the packet header of the first packet, and the second indication information is located in the second extension bit of the second packet. For a format of the second packet, refer to formats of the first packet in FIG. 9B, FIG. 9C. FIG. 10B, and FIG. 10C.

In a possible implementation, the first extension bit is a control request extension bit; and the second extension bit is a subtype extension bit.

FIG. 11 is an example 5 of a format of a first packet in an implementation (C) according to an embodiment of this application. The mobile phone 100 and the application server 200 perform scheduler policy and/or PM policy negotiation in a secure handshake phase of the QUIC protocol, and extend a transport parameter of QUIC, including a subtype extension bit and a control request extension bit to implement a policy negotiation function. A subtype specifies a format of a control request packet. For details, refer to Table 2.

TABLE 2

| Subtype | Control request |
| --- | --- |
| Scheduler policy negotiation | Scheduler policy negotiation information |
| PM policy negotiation | PM policy negotiation information |
| Simultaneous negotiation of a scheduler policy and a PM policy | Scheduler policy negotiation information & PM policy negotiation information |

Figure 14A:
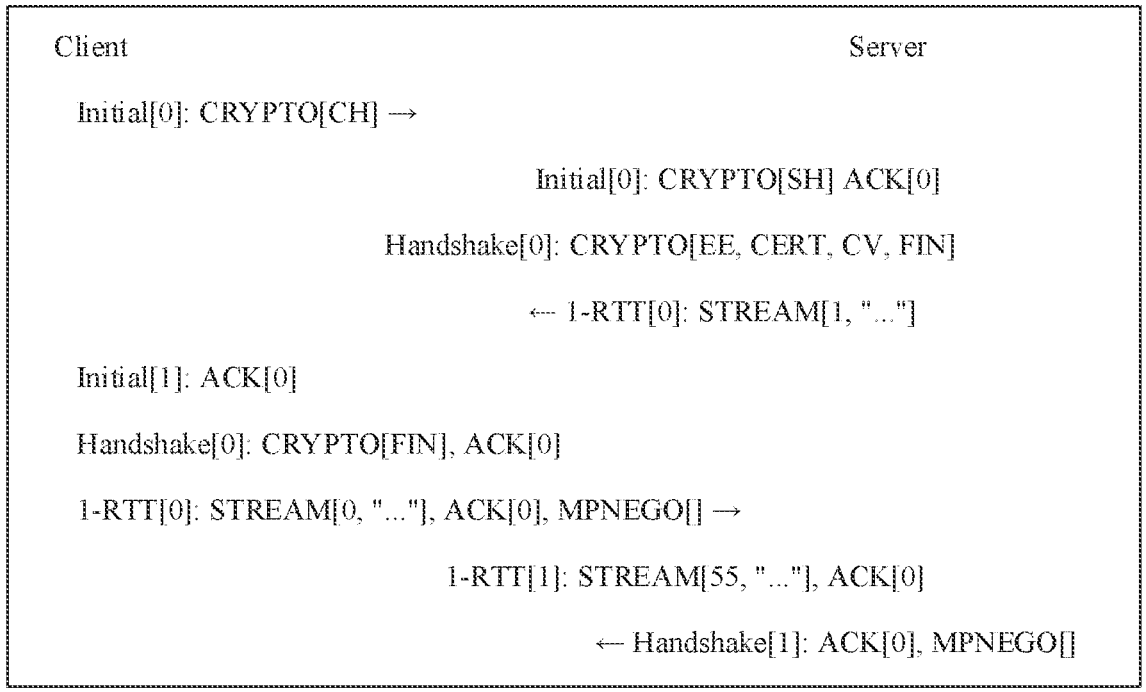
FIG. 14A is an example 1 of an MPQUIC negotiation procedure according to an embodiment of this application.
Figure 14B:
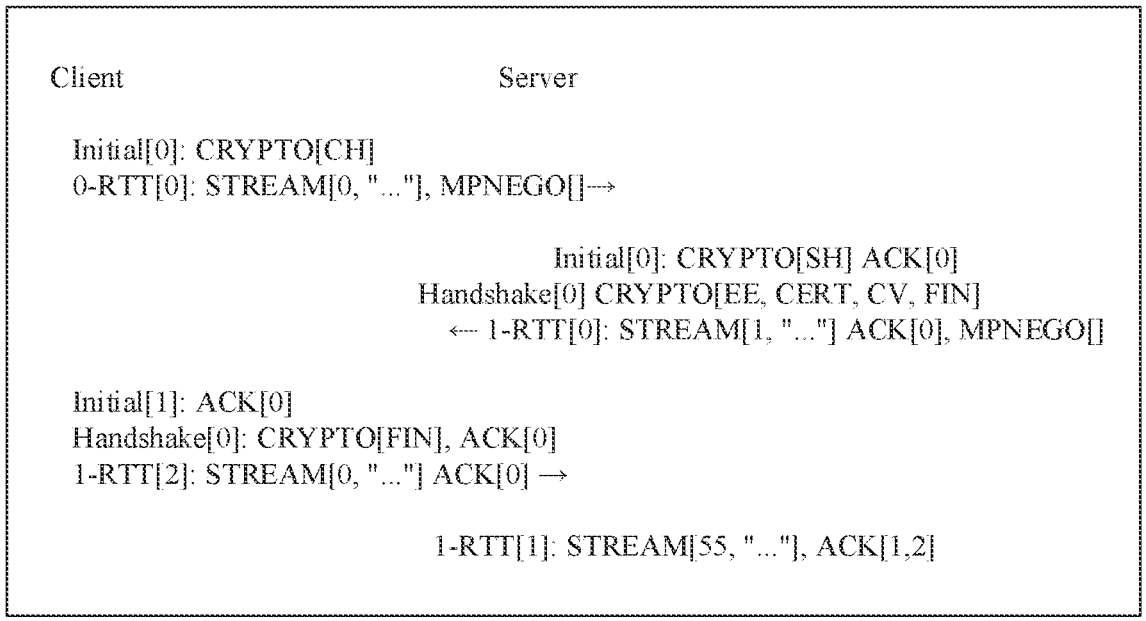
FIG. 14B is an example 2 of an MPQUIC negotiation procedure according to an embodiment of this application.

For an MPQUIC extension packet shown in FIG. 11, negotiation of a transmission policy may be classified into 1RTT negotiation and 0RTT negotiation. The 1RTT negotiation means that one round trip time is required to complete a negotiation process, and the 0RTT negotiation means that a negotiation process can be completed without a round trip time. A scenario of the 1RTT negotiation may be first multipath communication between the mobile phone 100 and the application server 200. A specific process is that the mobile phone 100 first performs public/private key pairing with the application server 200, and then performs multipath communication, as shown in FIG. 14A. A scenario of the 1RTT negotiation may be non-first multipath communication between the mobile phone 100 and the application server 200. That is, if the mobile phone 100 and the application server 200 each have obtained a public/private key in previous multipath communication, multipath communication may be directly performed, as shown in FIG. 14B.

The mobile phone 100 sends the first packet to the application server 200 in the phase 2, namely, the data transmission phase. FIG. 12 is an example 6 of a format of a first packet in an implementation (1) according to an embodiment of this application. 12A in FIG. 12 is an existing MPTCP packet, and 12B in FIG. 12 is an MPTCP extension packet in this embodiment of this application. Compared with the existing MPTCP packet, the MPTCP extension packet separately uses RR bits as a second extension bit and a third extension bit, and the second extension bit and the third extension bit are separately used to carry indication information indicating that the first packet includes the scheduler policy negotiation information and indication information indicating that the first packet includes the PM policy negotiation information. If an X bit is 1, it indicates that the first packet includes the scheduler policy negotiation information. If a Y bit is 1, it indicates that the first packet includes the PM policy negotiation information. Specifically, the transmission policy negotiation information is carried in the first extension bit.

Further, FIG. 13 is an example 7 of a format of a first packet in an implementation (2) according to an embodiment of this application. The mobile phone 100 and the application server 200 perform scheduler policy and/or PM policy negotiation in the data transmission phase by using MPTCP, and extend a new MPTCP extension option, including a subtype extension bit and a control request extension bit, to implement a policy negotiation function. A subtype specifies a format of a control request packet. For details, refer to Table 2 above.

It may be understood that, to implement the functions of any one of the foregoing embodiments, the mobile phone 100 includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such an implementation goes beyond the scope of this application.

In the embodiments of this application, the mobile phone 100 may be divided into functional modules. For example, functional modules may be obtained through division based on corresponding functions, or two or more functions may be integrated into one processing module. The integrated module may be implemented in a form of hardware, or may be implemented in a form of a software functional module. It should be noted that, in this embodiment of this application, module division is an example, and is merely logical function division. During actual implementation, another division manner may be used.

Figure 15:
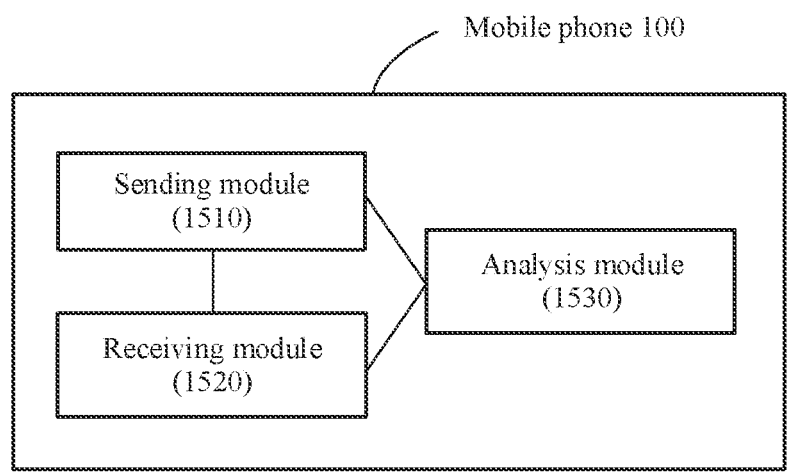
FIG. 15 is a schematic structural diagram of a mobile phone according to an embodiment of this application.

For example, when the functional modules are obtained through division in an integrated manner, FIG. 15 is a schematic structural diagram of a mobile phone according to an embodiment of this application. The mobile phone 100 may include a sending module 1510 and a receiving module 1520.

The sending module 1510 is configured to send a first packet including transmission policy negotiation information to an application server 200. The transmission policy negotiation information is used to negotiate a transmission policy used when the application server 200 uses a multipath connection. The receiving module 1520 is configured to receive, from the application server 200, a second packet including first policy information. The first policy information indicates a transmission policy used when the application server 200 uses a multipath connection. The sending module 1510 and the receiving module 1520 are further configured to transmit data to the application server 200 based on the first policy information in the second packet, by using a transmission policy corresponding to the first policy information. A type of the transmission policy indicated by the first policy information is the same as a type of the transmission policy indicated by the transmission policy negotiation information, and the type of the transmission policy is at least one of a path management policy and a data scheduling policy.

In a possible obtained structure, the mobile phone 100 may further include an analysis module 1530, configured to determine the transmission policy negotiation information.

Figure 16:
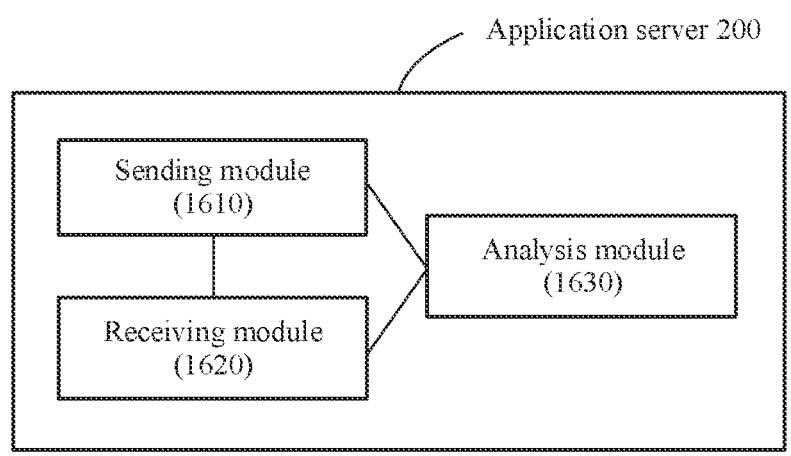
FIG. 16 is a schematic structural diagram of an application server according to an embodiment of this application.

Similarly, an application server 200 may also be divided into functional modules in the integrated manner. FIG. 16 is a schematic structural diagram of an application server according to an embodiment of this application. The application server 200 may include a sending module 1610, a receiving module 1620, and an analysis module 1630.

The receiving module 1620 is configured to receive, from a mobile phone 100, a first packet including transmission policy negotiation information, where the transmission policy negotiation information is used to negotiate a transmission policy used when the application server 200 uses a multipath connection. The analysis module 1630 is configured to determine first policy information based on the transmission policy negotiation information in the first packet, where the first policy information indicates a transmission policy used when the application server 200 uses a multipath connection. The sending module 1610 is configured to send data to the mobile phone 100 by using the transmission policy indicated by the first policy information. The receiving module 1620 is further configured to receive data from the mobile phone 100 by using the transmission policy indicated by the first policy information.

It should be noted that the sending module 1510 and the receiving module 1520 of the mobile phone 100 and the sending module 1610 and the receiving module 1620 of the application server 200 may include a radio frequency circuit. Specifically, in this embodiment of this application, the sending module 1510, the receiving module 1520, the sending module 1610, and the receiving module 1620 may receive and send a radio signal by using a radio frequency circuit. Usually, the radio frequency circuit includes but is not limited to an antenna, at least one amplifier, a transceiver, a coupler, a low noise amplifier, a duplexer, and the like. In addition, the radio frequency circuit may further communicate with another device through wireless communication. The wireless communication may use any communications standard or protocol, including but not limited to the global system for mobile communications, a general packet radio service, code division multiple access, wideband code division multiple access, long term evolution, email, an SMS message service, and the like.

In an optional manner, when software is used to implement data transmission, the data transmission may be implemented completely or partially in a form of a computer program product. The computer program product includes one or more computer instructions. When the computer program instructions are loaded and executed on a computer, the procedures or functions according to the embodiments of this application are all or partially implemented. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Method or algorithm steps described in combination with the embodiments of this application may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a detection apparatus. Certainly, the processor and the storage medium may exist in the detection apparatus as discrete components.

According to the foregoing descriptions about implementations, a person skilled in the art can clearly understand that, for ease of convenient and brief description, division of the foregoing functional modules is used as an example for illustration. In actual application, the foregoing functions can be allocated to different modules and implemented as required, that is, an inner structure of an apparatus is divided into different functional modules to implement all or some of the functions described above.

In the several embodiments provided in this application, it should be understood that the disclosed user equipment and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, in other words, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, wherein the method is used for a multipath connection between a first device and a second device, and wherein the method comprises:
sending, by the first device, a first packet to the second device, wherein the first packet comprises transmission policy negotiation information, and wherein the transmission policy negotiation information indicates a first transmission policy used when the first device uses the multipath connection to transmit data, wherein the first transmission policy is used to determine a second transmission policy used when the second device uses the multipath connection;
receiving, by the first device, a second packet from the second device, wherein the second packet comprises first policy information, and wherein the first policy information indicates the second transmission policy used when the second device uses the multipath connection; and
transmitting, by the first device, data with the second device based on the first policy information by using a third transmission policy corresponding to the first policy information, wherein a type of the third transmission policy indicated by the first policy information is the same as a type of the first transmission policy indicated by the transmission policy negotiation information, and wherein the type of the first transmission policy is at least one of a path management policy or a data scheduling policy.

2. The method according to claim 1, wherein:
the transmission policy negotiation information comprises at least one of second policy information, third policy information, or fourth policy information; and
the second policy information indicates the first transmission policy used when the first device uses the multipath connection to transmit data, the third policy information indicates a transmission policy used when the first device establishes the multipath connection used by the second device to transmit data, and the fourth policy information indicates at least one transmission policy that is supported by the first device.

3. The method according to claim 1, wherein the path management policy indicates a policy for establishing at least one path of the multipath connection between the first device and the second device, and wherein the data scheduling policy indicates a policy for allocating data on the multipath connection during data transmission.

4. The method according to claim 1, wherein the first packet and the second packet each comprises a first extension bit, wherein the transmission policy negotiation information is located in the first extension bit of a packet header of the first packet, and wherein the first policy information is located in the first extension bit of a packet header of the second packet.

5. The method according to claim 1, wherein the first packet further comprises first indication information, and wherein the first indication information is used to indicate that the first packet comprises the transmission policy negotiation information.

6. The method according to claim 5, wherein the second packet further comprises second indication information, and wherein the second indication information is used to indicate that the second packet comprises the first policy information.

7. The method according to claim 6, wherein the first packet and the second packet each comprises a second extension bit, wherein the first indication information is located in the second extension bit of a packet header of the first packet, and wherein the second indication information is located in the second extension bit of a packet header of the second packet.

8. The method according to claim 1, wherein the method further comprises:
determining, by a protocol stack of the first device, the transmission policy negotiation information based on a data transmission requirement of an application corresponding to the multipath connection.

9. The method according to claim 1, wherein the multipath connection is a multipath transmission control protocol (MPTCP) connection or a multipath quick user data packet internet connection (MPQUIC) connection.

10. A data transmission method, wherein the method is used for a multipath connection between a first device and a second device, and wherein the method comprises:
receiving, by the second device, a first packet from the first device, wherein the first packet comprises transmission policy negotiation information, and wherein the transmission policy negotiation information indicates a first transmission policy used when the first device uses the multipath connection to transmit data, wherein the first transmission policy is used to determine a second transmission policy used when the second device uses the multipath connection; and
transmitting, by the second device, data with the first device by using a third transmission policy corresponding to the transmission policy negotiation information, wherein a type of the first transmission policy is at least one of a path management policy or a data scheduling policy.

11. The method according to claim 10, wherein:
the transmission policy negotiation information comprises at least one of second policy information, third policy information, or fourth policy information; and
the second policy information indicates the first transmission policy used when the first device uses the multipath connection to transmit data, the third policy information indicates a transmission policy used when the first device establishes the multipath connection used by the second device to transmit data, and the fourth policy information indicates at least one transmission policy that is supported by the first device.

12. The method according to claim 10, wherein the method further comprises:
sending, by the second device, a second packet to the first device based on the first packet, wherein the second packet comprises first policy information, and wherein the first policy information indicates the second transmission policy used when the second device uses the multipath connection.

13. The method according to claim 12, wherein:
the transmission policy negotiation information comprises third policy information; and
when the second device supports a transmission policy indicated by the third policy information, the third transmission policy indicated by the first policy information is the transmission policy indicated by the third policy information.

14. The method according to claim 13, wherein the transmission policy negotiation information further comprises fourth policy information, and wherein:

when the second device does not support the transmission policy indicated by the third policy information, the third transmission policy indicated by the first policy information is a transmission policy that is supported by the second device and that has performance similar to that of the transmission policy indicated by the third policy information; or the third transmission policy indicated by the first policy information is a transmission policy indicated by the fourth policy information.

15. The method according to claim 12, wherein:

the transmission policy negotiation information comprises the second policy information; and when the second device supports a transmission policy indicated by the second policy information, the third transmission policy indicated by the first policy information is the transmission policy indicated by the second policy information.

16. The method according to claim 15, wherein the transmission policy negotiation information further comprises fourth policy information, and wherein:

when the second device does not support the transmission policy indicated by the second policy information, the third transmission policy indicated by the first policy information is a transmission policy that is supported by the second device and that has performance similar to that of the transmission policy indicated by the second policy information; or the third transmission policy indicated by the first policy information is a transmission policy indicated by the fourth policy information.

17. The method according to claim 10, wherein the path management policy indicates a policy for establishing a multipath connection between at least two network addresses of the first device and at least two network addresses of the second device, and wherein the data scheduling policy indicates a data allocation policy used when the first device uses the multipath connection to transmit data.

18. The method according to claim 17, wherein the first packet and a second packet each comprises a first extension bit, wherein the transmission policy negotiation information is located in the first extension bit of a packet header of the first packet, and wherein first policy information is located in the first extension bit of a packet header of the second packet.

19. A first device, wherein the first device establishes a multipath connection to a second device, and wherein the first device comprises:

at least one processor;

a radio frequency circuit configured to send and receive a radio signal; and a non-transitory computer-readable storage medium, wherein the at least one processor, the radio frequency circuit, and the non-transitory computer-readable storage medium are coupled to each other, wherein the non-transitory computer-readable storage medium is configured to store computer program code, and wherein the computer program code comprises at least one instruction that when executed by the at least one processor, instructs the at least one processor to:

send a first packet to the second device, wherein the first packet comprises transmission policy negotiation information, and wherein the transmission policy negotiation information indicates a first transmission policy used when the first device uses the multipath connection to transmit data, wherein the first transmission policy is used to determine a second transmission policy used when the second device uses the multipath connection;

receive a second packet from the second device, wherein the second packet comprises first policy information, and wherein the first policy information indicates the second transmission policy used when the second device uses the multipath connection; and transmit data with the second device based on the first policy information by using a third transmission policy corresponding to the first policy information, wherein a type of the third transmission policy indicated by the first policy information is the same as a type of the first transmission policy indicated by the transmission policy negotiation information, and wherein the type of the first transmission policy is at least one of a path management policy or a data scheduling policy.

20. A second device, wherein the second device establishes a multipath connection to a first device, and wherein the second device comprises:

at least one processor;

a radio frequency circuit configured to send and receive a radio signal; and a non-transitory computer-readable storage medium, wherein the at least one processor, the radio frequency circuit, and the non-transitory computer-readable storage medium are coupled to each other, wherein the non-transitory computer-readable storage medium is configured to store computer program code, and wherein the computer program code comprises at least one instruction that when executed by the at least one processor, instructs the at least one processor to:

receive a first packet from the first device, wherein the first packet comprises transmission policy negotiation information, and wherein the transmission policy negotiation information indicates a first transmission policy used when the first device uses the multipath connection to transmit data, wherein the first transmission policy is used to determine a second transmission policy used when the second device uses the multipath connection; and transmit data with the first device by using a third transmission policy corresponding to the transmission policy negotiation information, wherein a type of the first transmission policy is at least one of a path management policy or a data scheduling policy.

* * * * *

UNITED STATES PATENT AND TRADEMARK OFFICE
CERTIFICATE OF CORRECTION

PATENT NO. : 11,277,313 B2
APPLICATION NO. : 17/145932
DATED : March 15, 2022
INVENTOR(S) : Nagesh S, Zhen Cao and Jianjian Zhu Page 1 of 1

It is certified that error appears in the above-identified patent and that said Letters Patent is hereby corrected as shown below:

In the Specification

Column 1/Line 8 - Delete "PCT/CN2019.128482," and insert -- PCT/CN2019/128482, --.

Signed and Sealed this
Fourth Day of October, 2022

Katherine Kelly Vidal
*Director of the United States Patent and Trademark Office*